United States Patent
Yamada et al.

(10) Patent No.: US 7,463,972 B2
(45) Date of Patent: Dec. 9, 2008

(54) NAVIGATION APPARATUS AND METHOD

(75) Inventors: Kunihiro Yamada, Okazaki (JP); Shino Kimura, Okazaki (JP); Kihachi Hayashida, Okazaki (JP); Minoru Ootake, Okazaki (JP); Akihiro Nakajima, Okazaki (JP); Nobuo Suzuki, Okazaki (JP); Atsuya Ooshima, Okazaki (JP)

(73) Assignee: AISIN AW Co., Ltd., Anjo (JP)

( * ) Notice: Subject to any disclaimer, the term of this patent is extended or adjusted under 35 U.S.C. 154(b) by 748 days.

(21) Appl. No.: 10/898,940

(22) Filed: Jul. 27, 2004

(65) Prior Publication Data

US 2005/0071078 A1  Mar. 31, 2005

(30) Foreign Application Priority Data

Sep. 26, 2003  (JP) .............................. 2003-334856
Dec. 26, 2003  (JP) .............................. 2003-435232
Dec. 26, 2003  (JP) .............................. 2003-435389

(51) Int. Cl.
*G01C 21/00* (2006.01)

(52) U.S. Cl. .................... 701/201; 701/23; 701/25; 701/206; 701/209; 701/210; 701/214; 340/988; 340/995.23

(58) Field of Classification Search .............. 701/23, 701/25, 201, 206, 208, 209, 210–212, 214; 340/988, 990, 995.1, 995.23

See application file for complete search history.

(56) References Cited

U.S. PATENT DOCUMENTS

| 6,047,235 | A | * | 4/2000 | Hiyokawa et al. ........... 701/201 |
| 6,049,753 | A |   | 4/2000 | Nimura |
| 6,298,303 | B1 |   | 10/2001 | Khavakh et al. |
| 6,418,373 | B1 | * | 7/2002 | Omi et al. .................... 701/209 |
| 6,678,611 | B2 |   | 1/2004 | Khavakh et al. |
| 2001/0004725 | A1 |   | 6/2001 | Yagyu |

FOREIGN PATENT DOCUMENTS

| JP | A 2000-9482 | 1/2000 |
| JP | A-2002-48571 | 2/2002 |
| WO | WO 98/54682 A1 | 12/1998 |

* cited by examiner

*Primary Examiner*—Gertrude Arthur Jeangla
(74) *Attorney, Agent, or Firm*—Oliff & Berridge, PLC

(57) ABSTRACT

A navigation apparatus includes a memory that stores registered routes, wherein each registered route includes a previously traveled route, a corresponding starting point, and a corresponding destination point. The navigation apparatus includes a controller that searches for a route from a specified starting point to a specified destination point, compares the searched route with the registered routes, and utilizes, if a corresponding starting point is substantially identical to the specified starting point or a corresponding destination point is substantially identical to the specified destination point, a portion of a registered route including the substantially identical starting point or the substantially identical destination point as a navigation route.

13 Claims, 18 Drawing Sheets

NAVIGATION APPARATUS AND METHOD

INCORPORATION BY REFERENCE

The disclosure of Japanese Patent Application No. 2003-334856 filed on Sep. 26, 2003, No. 2003-435232 filed on Dec. 26, 2003, and No. 2003-435389 filed on Dec. 26, 2003 including the specification, drawings and abstract are incorporated herein by reference in their entirety.

BACKGROUND OF THE INVENTION

1. Field of Invention

The present invention relates to a navigation apparatus.

2. Description of Related Art

In a conventional navigation apparatus for use on a vehicle such as a car, if a user or a driver of the vehicle sets a destination by operating an input unit, the current position of the vehicle detected by a current position detector is set as a starting point, a route from the starting point to the destination is searched for, and route navigation/guidance is performed along a route detected in the searching process. In the above route searching process, a route that is the shortest in distance from the starting point to the destination or a route that is the shortest in time needed to reach the destination is selected.

However, in general, in the route searching process, roads having a rather large width are preferentially selected, and actual traffic conditions such as traffic congestion or driving ease on roads are not taken into account. Thus, the selected route is not necessarily a route that is the shortest in time needed to reach the destination. Furthermore, users' preferences (such as that for a route including a smallest number of turns that cross oncoming traffic) are not reflected in the selection of the navigation route. To alleviate the above problems, it has been proposed to register routes corresponding to a starting point and a destination in storage means and reduce the search cost of the registered routes. Another known technique is to record previously traveled routes in a storage means and employ a part or whole of a recorded route in searching for a route when an input starting point and an input destination is on the recorded route (a specific example of this technique may be found, for example, in Japanese Unexamined Patent Application Publication No. 2000-9482).

By using techniques in which previously traveled routes are reflected in route selection, it is possible to select a route that is shortest in travel time or a route that meets a user's particular preference.

SUMMARY OF THE INVENTION

However, in the conventional navigation apparatuses described above, registered or recorded routes can only be used when both the starting point and the destination of a route to search for are identical to those of registered or recorded routes. Because of this restriction, for example, when a route from a remote unregistered or recorded place to a user's home is searched for, there is a possibility that a portion of the route which is in an area near the user's home and well known and preferred by a user is not selected as part of the route detected in the route searching process. That is, there is a possibility that a route unsuitable for the user is selected.

Thus, various exemplary embodiments of this invention provide a navigation apparatus capable of selecting a navigation route such that when a route from a starting point to a destination is detected as a result of a route searching process, if there is a registered route whose starting point or destination is substantially identical to that of the route detected in the route searching process, at least a part of the registered route, including the substantially identical starting point or the substantially identical destination, is utilized as the navigation route. Thereby route navigation/guidance is provided along a route that is more suitable for a user.

Various exemplary embodiments of this invention provide a navigation apparatus, including a memory that stores registered routes, wherein each registered route includes a previously traveled route, a corresponding starting point, and a corresponding destination point. The navigation apparatus includes a controller that searches for a route from a specified starting point to a specified destination point, compares the searched route with the registered routes, and utilizes, if a corresponding starting point is substantially identical to the specified starting point or a corresponding destination point is substantially identical to the specified destination point, a portion of a registered route including the substantially identical starting point or the substantially identical destination point as a navigation route.

Various exemplary embodiments of this invention provide a method for determining a navigation route, including storing registered routes, wherein each registered route includes a previously traveled route, a corresponding starting point, and a corresponding destination point, searching for a route from a specified starting point to a specified destination point, comparing the searched route with the at least one registered route, and utilizing, if a corresponding starting point is substantially identical to the specified starting point or a corresponding destination point is substantially identical to the specified destination point, a portion of a registered route including the substantially identical starting point or the substantially identical destination point as a navigation route.

Various exemplary embodiments of this invention provide storage medium storing a set of program instructions executable on a data processing device and usable for determining a navigation route, the set of program instructions including instructions for storing registered routes, wherein each registered route includes a previously traveled route, a corresponding starting point, and a corresponding destination point, instructions for searching for a route from a specified starting point to a specified destination point, instructions for comparing the searched route with the at least one registered route, and instructions for utilizing, if a corresponding starting point is substantially identical to the specified starting point or a corresponding destination point is substantially identical to the specified destination point, a portion of a registered route including the substantially identical starting point or the substantially identical destination point as a navigation route.

BRIEF DESCRIPTION OF THE DRAWINGS

Exemplary embodiments of the invention will now be described with reference to the accompanying drawings, wherein.

DETAILED DESCRIPTION OF EXEMPLARY EMBODIMENTS

Figure 2:
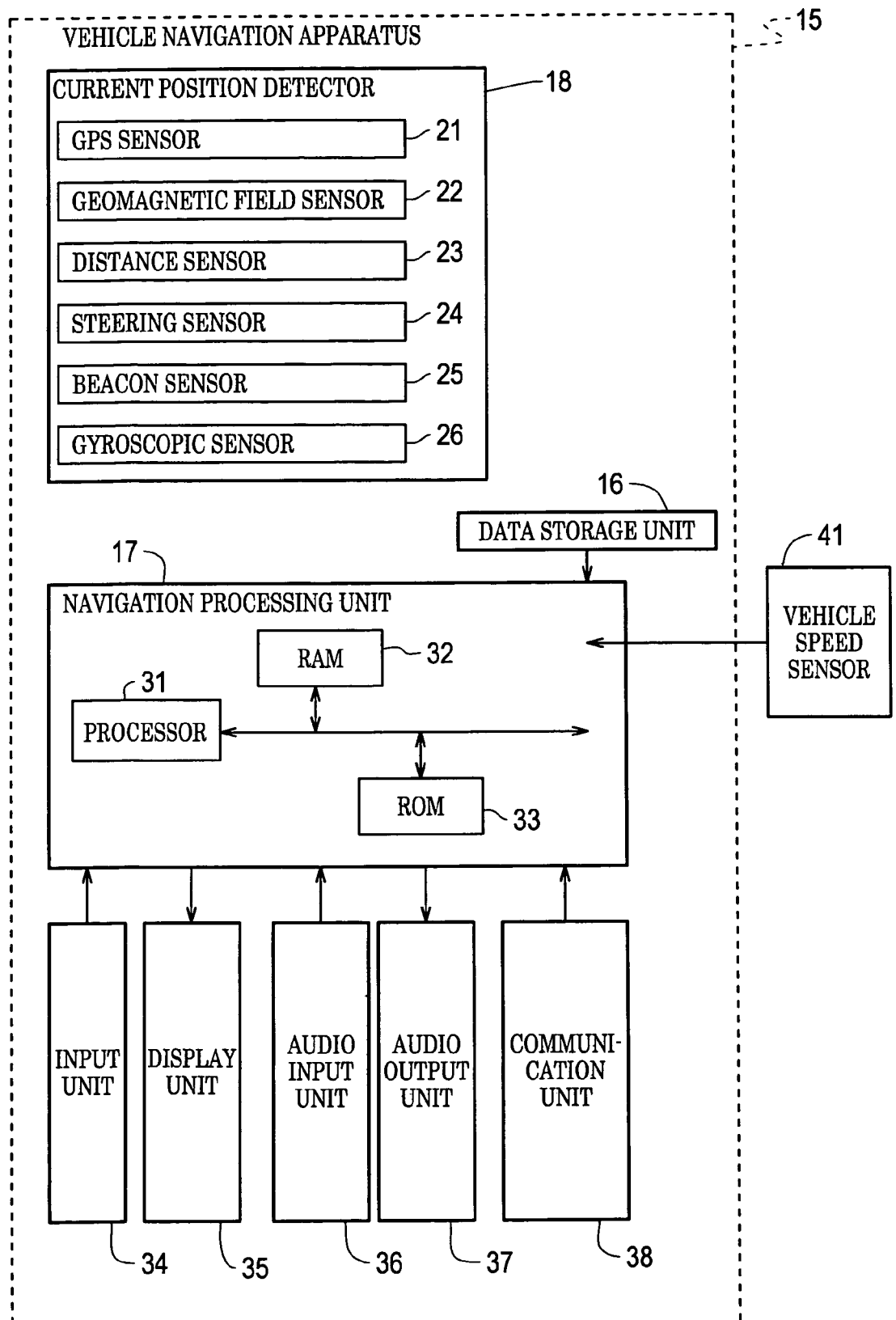
FIG. 2 is a diagram showing a structure of the vehicle navigation apparatus according to the first exemplary embodiment of the invention.
Figure 3:
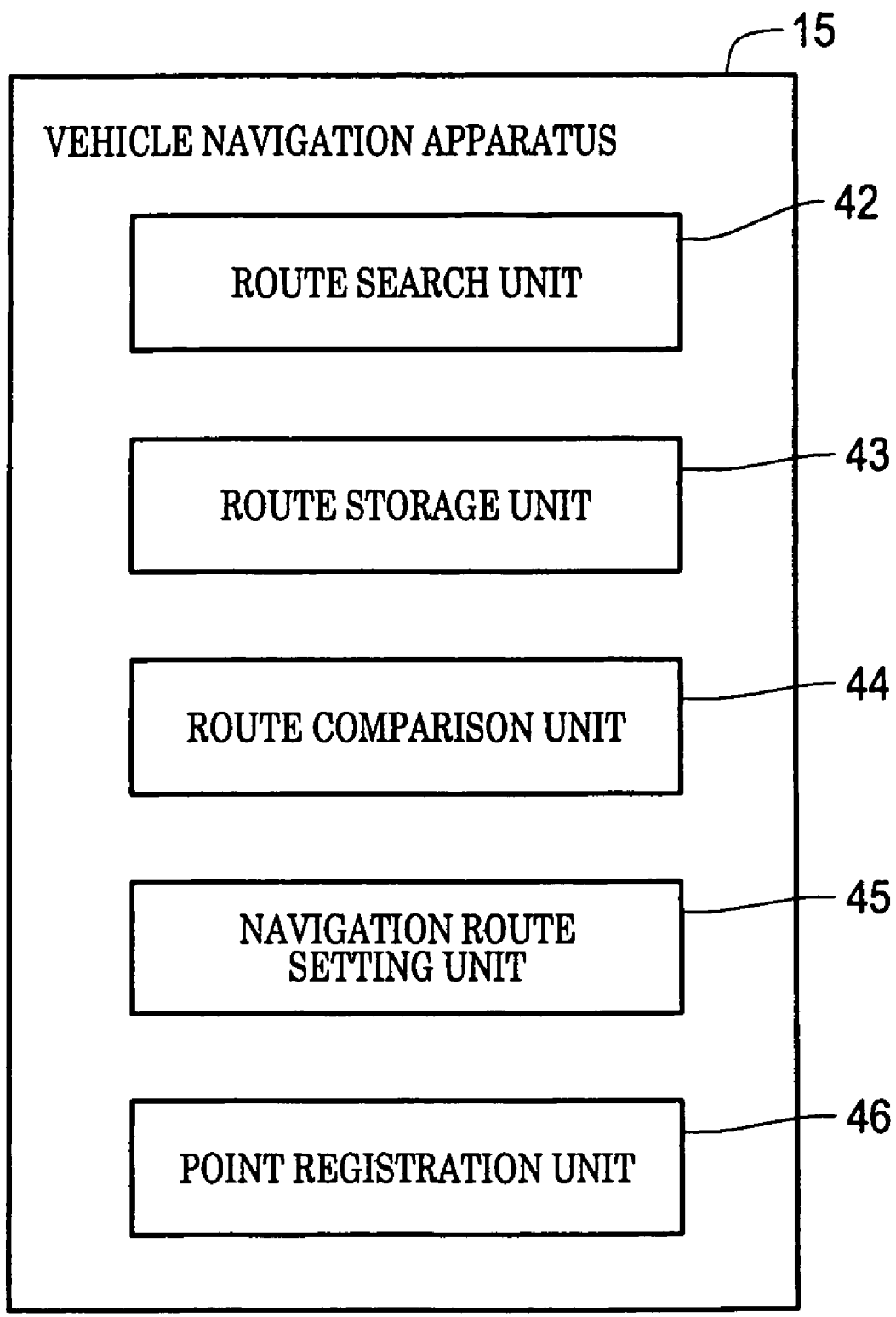
FIG. 3 is a diagram showing a functional structure of the vehicle navigation apparatus according to the first exemplary embodiment of the invention.

FIG. 2 is a diagram showing a structure of a vehicle navigation apparatus according to a first exemplary embodiment of the invention. FIG. 3 is a diagram showing a functional structure of a vehicle navigation apparatus according to the first exemplary embodiment of the invention.

FIG. 2 shows a vehicle navigation apparatus 15 for use on a vehicle such as, for example, a passenger car, a truck, a bus, or a motorcycle. The vehicle navigation apparatus 15 is, for example, a type of computer and can include a current position detector 18 for detecting a current position, a data storage medium used as a data storage unit 16 for storing road data, search data, etc., and a navigation processing unit 17 for performing various kinds of processes such as, for example, navigation processing based on input information. The navigation apparatus 15 can further include an input unit 34, a display unit 35, an audio input unit 36, an audio output unit 37, and a communication unit 38. A vehicle speed sensor 41 may be connected to the navigation processing unit 17.

The current position detector 18 can include, for example, a GPS (Global Positioning System) sensor 21, a geomagnetic field sensor 22, a distance sensor 23, a steering sensor 24, a beacon sensor 25, a gyroscopic sensor 26, and/or an altimeter (not shown). All of the GPS sensor 21, the geomagnetic field sensor 22, the distance sensor 23, the steering sensor 24, the beacon sensor 25, the gyroscopic sensor 26, and the altimeter are not necessarily needed. Accordingly, one or more may be removed depending on production cost and/or resources.

The GPS sensor 21 can detect a current global position by receiving radio waves transmitted from artificial satellites (GPS satellites). The geomagnetic field sensor 22 can detect the direction of a vehicle by measuring geomagnetism. The distance sensor 23 can detect the distance between particular positions on a road on the basis of, for example, the rotation speed of wheels (not shown) or on the basis of the value obtained by doubly integrating the vehicle's acceleration.

The steering sensor 24 can detect a steering angle. As the steering sensor 24, for example, an optical rotation sensor or a rotational resistance sensor attached to a rotating part of a steering wheel (not shown), an angle sensor disposed on a wheel, or a similar sensor may be used.

The beacon sensor 25 can detect a current position by receiving position information from beacons disposed along roads. The gyroscopic sensor 26 can detect the angular rotation speed, i.e., a turning angle, of the vehicle. As the gyroscopic sensor 26, for example, a gas-rate gyroscope, a vibrating gyroscope, or the like can be used. The direction of the vehicle may be detected by integrating a turning angle detected by, for example, the gyroscopic sensor 26.

Note that each of the GPS sensor 21 and the beacon sensor 25 can independently detect the current position of the vehicle. The current position of the vehicle can also be determined based on a combination of the distance detected by the distance sensor 23 and the direction detected by the geomagnetic field sensor 22 and/or the gyroscopic sensor 26. Alternatively, the current position can be detected based on a combination of the distance detected by the distance sensor 23 and the steering angle detected by the steering sensor 24.

In the data storage unit 16, various kinds of data are stored, for example, as files in the form of a database. Such data can include, for example, search data used in searching for a route, map data, and facility data. According to the stored data, various kinds of information may be displayed on the screen of the display unit 35. For example, a navigation map along a route detected via searching, a photograph or a simplified diagram indicating a feature of an intersection or a route, the distance to a next intersection, the traffic structure of the next intersection, and/or other kinds of information are displayed. Various kinds of data used by the audio output unit 37 to output audio information may also be stored in the data storage unit 16.

The search data can include intersection data, node data, road data, traffic restriction data, and/or route display data. The intersection data can include data indicating the number of intersections described in the intersection data, data associated with respective intersections, and/or identification numbers assigned to the respective intersections. The intersection data may also include data indicating the number of roads joining the intersection and/or identification numbers identifying respective roads. The intersection data may further include data indicating the type of each intersection, for example, data indicating whether traffic lights are installed or no traffic lights are installed. The node data may represent at least locations and shapes of roads stored in the map data. The node data may further include data indicating branch points (including intersections and T junctions), nodes, and links between adjacent nodes of actual roads. Note that a bending point of a road may also be regarded as a node.

The road data can include, for example, data indicating the number of roads described in the road data, data associated with respective roads, and/or identification numbers assigned to the respective roads. The data associated with each road can indicate the road type, the length of the road, and the travel time indicating the time needed to travel the road. The road type refers to, for example, a road attribute indicating an administration-classified road type such as a national road, a prefectural road, a main local road, a general road, and an expressway.

Preferably, the road data may further include data indicating properties of the road itself such as a road width, a slope, a cant, an altitude, a bank, a road surface state, presence/absence of center divider, the number of lanes, a point at which the number of lanes decreases, and/or a point at which the width decreases. In the case of an expressway or a main road, a set of lanes in one direction may be stored as a portion of road data and another set of lanes in the opposite direction may be separately stored as another portion of road data. Thus, each expressway or main road may be treated as two roads. For example, a main road having two or more lanes in each direction may be effectively treated as two roads, one road including a set of inbound lanes and one road including a set of outbound lanes.

Preferably, the road data may further include corner data indicating the curvature radius, an intersection, a T-junction, and/or a corner entrance. The road data may further include a road attribute such as, for example, a railroad crossing, an expressway entrance/exit ramp, a tollgate of an expressway, a downhill road, and/or an uphill road.

The navigation processing unit 17 may be, for example, a CPU responsible for control over the whole vehicle navigation apparatus 15. The navigation processing unit 15 may include one or more processors 31 such as a microprocessor serving as operation means, a RAM (Random Access Memory) 32 used as a working memory by the processor 31 in various kinds of operation processing, and a ROM (Read Only Memory) 33 used as a storage medium for storing various kinds of programs. The ROM 32 may store, for example, a control program, a route search program for searching for a route to a destination, a navigation program for providing navigation/guidance along a route, a program for determining a particular section, and a program for searching for a point or a facility. The navigation processing unit 17 can be connected to the input unit 34, the display unit 35, the audio input unit 36, the audio output unit 37, and the communication unit 38. The navigation processing unit 17 may perform various processes such as, for example, searching for a route, navigation/guidance along a route, determination of a specific section, and/or searching for a point or a facility. The audio input unit 36 and the audio output unit 37 are not necessarily needed. Accordingly, one or both may be removed depending on production cost and/or production resources.

The data storage unit 16 and the ROM 33 may each be formed of a magnetic core or a semiconductor memory. The data storage unit 16 or the ROM 33 may also be a magnetic tape, a magnetic disk, a magnetic drum, a CD-R/W, an MD, a DVD-RAM, a DVD-R/W, an optical disc, an MO, an IC card, an optical card, or a memory card. The data storage unit and/or ROM may be installed in the vehicle navigation apparatus 15 in a fixed fashion or a user-removable fashion.

Although according to this exemplary embodiment, programs may be stored in the ROM 33, and data may be stored in the data storage unit 16, programs and data may be stored on an external storage medium. In this case, for example, a storage medium such as a flash memory (not shown) may be disposed in the navigation processing unit 17, and programs and/or data may be loaded into this storage medium from the external storage medium. This makes it possible to update the program and/or data by exchanging the external storage medium. Thus, various kinds of processes can be performed in accordance with programs and data stored on the storage medium. As the external storage medium, any type of storage medium such as, for example, a magnetic tape, a magnetic disk, a magnetic drum, a CD-R/W, an MD, a DVD-RAM, a DVD-R/W, an optical disc, an MO, an IC card, an optical card, or a memory card can be used.

The communication unit 38 serves to communicate with, for example, an FM transmitter, a telephone network, the Internet, a portable telephone network, wireless LAN (Local Area Network), and the like, to receive various kinds of information. Such information may include, for example, traffic information such as traffic congestion information via an information sensor (not shown), traffic accident information, and/or D-GPS information indicating the detection error of the GPS sensor 21. The various programs and data used to operate the vehicle navigation apparatus 15 may be downloaded from an information center (such as an Internet server or a navigation server) via one or more base stations (such as a provider terminal of the Internet or a communication station connected to the communication unit 38 via a telephone network or other communication networks) via the communication unit 38. In this case, if at least a part of the programs and/or data is received via the base stations, the processor 31 stores the downloaded programs or data into a read/write memory such as the RAM 32, a flash memory, or a hard disk, and the processor 31 performs various kinds of processes in accordance with the program and data. The downloaded programs and the downloaded data may be stored separately on different storage media or may be stored on the same storage medium.

A program and/or data may also be downloaded from an information center into a storage medium such as, for example, a memory card or CD-R that can be removably mounted on a personal computer installed in a home. Accordingly, various kinds of processes may be performed in accordance with the program and/or data stored in the storage medium.

The input unit 34 may be used, for example, to input a destination point or correct a starting point. The input unit 34 can include operation keys, push buttons, a jog dial, and/or arrow keys disposed on the main part of the vehicle navigation apparatus 15. Alternatively, a remote controller may be used as the input unit 34. If the display unit 35 is in the form of a touch panel, the input unit 34 can be advantageously realized using operation switches and/or operation menu keys displayed on the screen of the display unit 35. In this case, a command/data can be input by pressing or touching an operation switch, as with a usual touch panel.

Various information, for example, including guide information on operations, operation menus and operation keys, a route from the current position to the destination, guide information along the route, and other information may be displayed on a screen of the display unit 35. As the display unit 35, for example, a CRT, a liquid crystal display, an LED (Light Emitting Diode) display, a plasma display, or a hologram device that projects a hologram on front glass may be used.

The audio input unit 36 can include a microphone (not shown) for inputting a voice to be recognized and a voice recognition unit (not shown). Using the audio input unit 36, it is possible to input a voice indicating necessary information. More specifically, the audio input unit 36 allows a user to input a destination or a root search command by voice without having to operate the input unit 34. The audio output unit 37 can include a voice synthesizer and a loudspeaker. Audio indicating, for example, guide information or speed change information may be synthesized by the voice synthesizer and output from the loudspeaker to provide the information to a user. Not only voices synthesized by the voice synthesizer, but also various other kinds of sounds and various other kinds of guide information recorded in advance on a tape or a memory can also be output from the loudspeaker.

According to the present exemplary embodiment, as shown in FIG. 3, the vehicle navigation apparatus 15 may be theoretically divided into functional units such as, for example, a route search unit 42 for searching for a route from a specified starting point to a specified destination point, a route storage unit 43 for storing a route taken in the past as a registered route together with its starting point and destination point, a route comparison unit 44 for making a comparison between a detected route and a registered route, a navigation route setting unit 45 for setting a navigation route based on a result of the comparison made by the route comparison unit 44, and a point registration unit 46 for registering a particular point as a registered point.

The route search unit 42 searches for a route from a specified starting point to a specified destination point in a similar manner to a conventional navigation apparatus. The current position of the vehicle is generally input automatically by, for example, the current position detector 18, and employed as the starting point, although an arbitrary starting point can be input by a user. The route search unit 42 accesses, for example, the data stored in the data storage unit 16, and searches for a shortest route from the input starting point to the input destination point. The shortest route may be a route with the shortest distance or a route with the shortest travel time. In searching for a route, the route search unit 42 may take into account information such as traffic information provided by VICS® (Vehicle Information & Communication System). If a route detected in the searching process is set as a navigation route along which navigation/guidance will be performed, the navigation route and guidance information along the navigation route may be displayed on the screen of the display unit 35, and a voice of guidance information may be output from the audio output unit 37, thereby providing route navigation/guidance.

When the vehicle arrives at the destination after traveling along the navigation route from the input starting point to the input destination point, if the user determines that the route should be stored, the route storage unit 43 stores the route as a registered route together with the corresponding starting point and the corresponding destination point in the route bank. The route bank refers to a storage area for storing registered routes in a storage means such as, for example, the data storage unit 16 or the RAM 32.

Note that the route storage unit 42 can also store a route as a registered route that was provided as a result of route navigation/guidance. For example, a route along which the vehicle travels on a frequent (e.g., daily) basis, such as a commute route to a company or a school, may be recorded and registered as a registered route of the vehicle. In this case, if a user registers particular points such as locations of a user's home, a company, and/or schools in the point registration unit 46, routes actually taken by the vehicle between registered points are recorded even if they are not provided as a result of route navigation/guidance. Frequent daily routes may be determined, for example, on the basis of the number of miles traveled during a predefined time period. A route along which the vehicle travels more frequently than a predetermined number of times is detected and stored as a registered route. For example, a route that is taken once or more every week may be regarded as a frequent route. Such a route can be detected by finding a recorded route of the vehicle whose number of occurrences in a particular period is equal to or greater than a predetermined value.

The route comparison unit 44 determines whether there is a registered route whose starting point or destination is substantially identical to that of the detected route. As used herein, "substantially identical" means close enough to the same starting point or same destination such that a route to the starting point or destination of the registered route would be useful to the respective starting point or destination of the detected route. For example, according to various exemplary embodiments of the invention a starting point or destination of a registered route may be considered substantially identical if it within 100 meters, 1000 meters, or some other predetermined distance of the respective starting point or destination of the detected route.

If such a registered route is found, the route comparison unit 44 further determines whether there is a node included in both the registered route and the detected route. Specifically, the route comparison unit 44 determines whether there is a registered route whose starting point or destination is substantially identical to that of the detected route, by comparing the route detected by the route search unit 42 with registered routes stored in the route bank. If it is determined that there is a registered route whose starting point or destination is substantially identical to that of the detected route, the route comparison unit 44 then determines whether there is a same node included in both routes, for example, whether there is a node at which the two routes cross each other.

If there is a node that is included in both the detected route and the registered route, the navigation route setting unit 45 employs a part of the registered route from the starting point or the destination (whichever is in common with the detected route and registered route) to that node as a navigation route. Specifically, when there is a registered route whose starting point is substantially identical to that of the detected route, and there is a node included in both the registered route and the detected route, the navigation route setting unit 45 set the navigation route such that the registered route is utilized from the starting point to the common node and the detected route is utilized from the common node to the destination. Thus, in an area near the starting point, the registered route, which is a more suitable route for the user than the detected route, is selected as the navigation route from the starting point to the common node.

When there is a registered route whose destination is substantially identical to that of the detected route, and there is a node included in both the registered route and the detected route, the navigation route setting unit 45 sets the navigation route such that the detected route is utilized from the starting point to the common node and the registered route is utilized from the common node to the destination. Thus, in an area near the destination, the registered route, which is a more suitable route for the user than the detected route, is selected as the navigation route from the common node to the destination.

If there is a registered route whose starting point and destination are both substantially identical to those of the detected route, the navigation route setting unit 45 selects the registered route as the navigation route. This makes it possible to set the navigation route from the starting point to the destination so that the registered route, which is more suitable for the user than the detected route, is preferentially selected.

Figure 4:
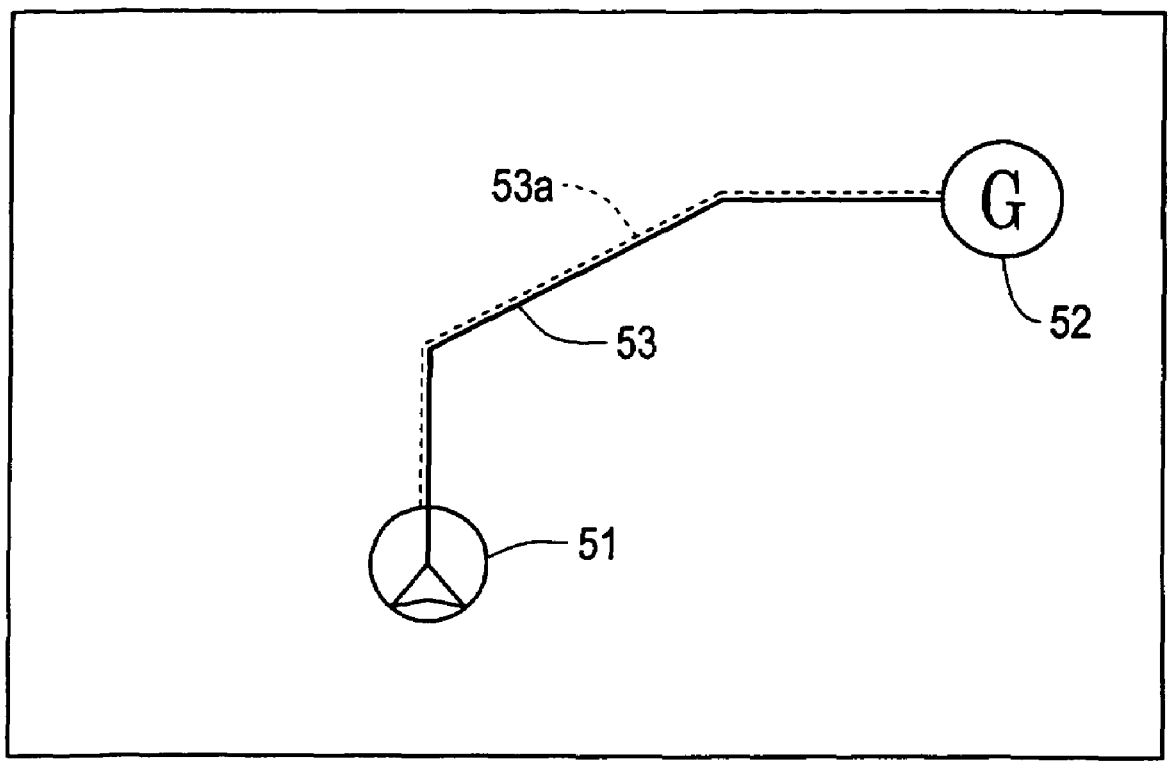
FIG. 4 is a diagram showing a registered route stored in the vehicle navigation apparatus according to the first exemplary embodiment of the invention.
Figure 5:
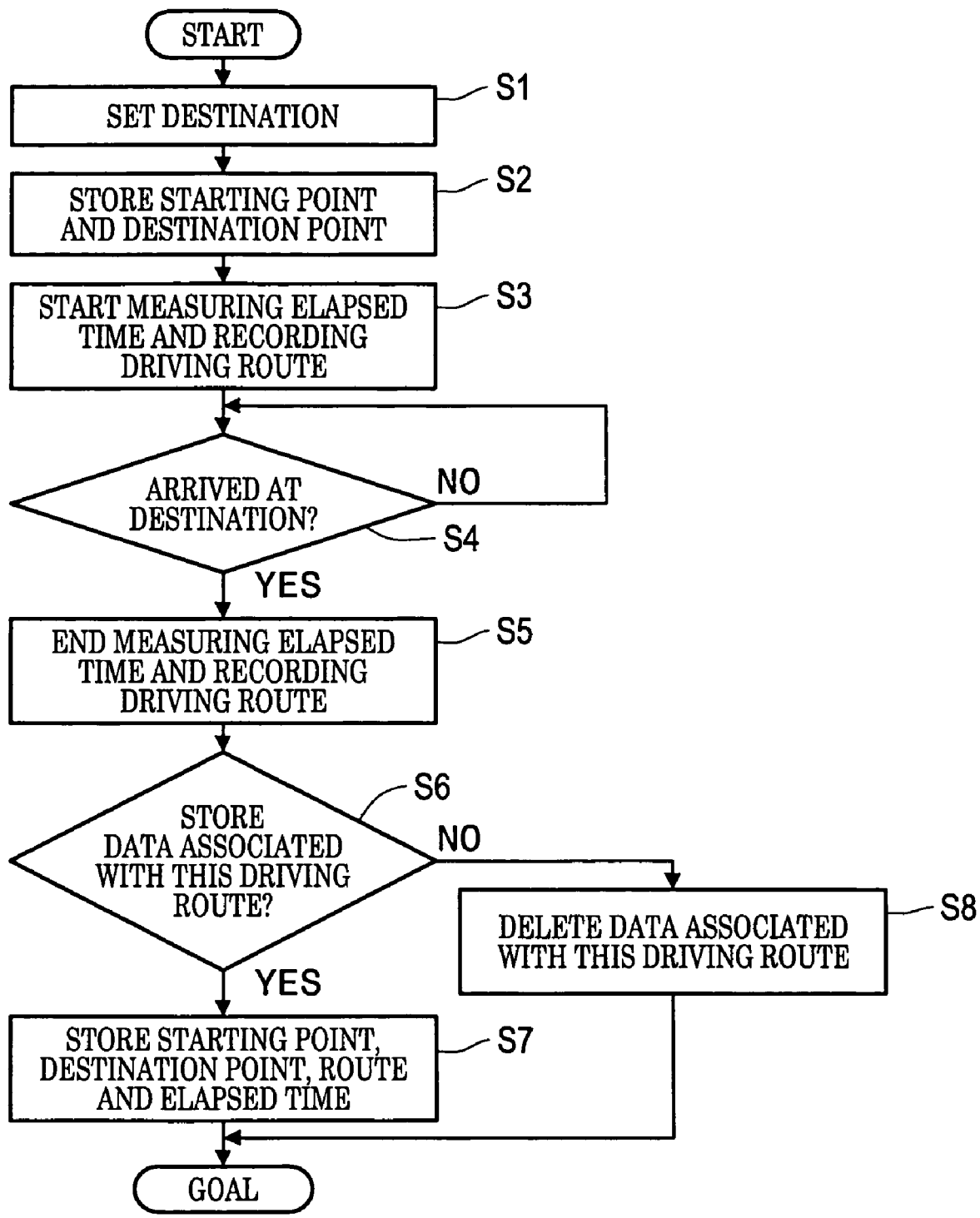
FIG. 5 is a flow chart showing a process performed by the vehicle navigation apparatus to store a route as a registered route into a route bank, according to the first exemplary embodiment of the invention.

The operation of the vehicle navigation apparatus 15 constructed in the above-described manner is described below. First, a process of storing a route as a registered route in the route bank is described with reference to FIGS. 4 and 5. FIG. 4 is a diagram showing a registered route stored in a vehicle navigation apparatus according to the first exemplary embodiment of the invention. FIG. 5 is a flow chart showing a process performed by the vehicle navigation apparatus to store a route as a registered route into a route bank, according to the first exemplary embodiment of the invention.

First, as shown by way of example in FIG. 4, the user or the driver of the vehicle prepares to record a route 53a to the destination 52 by operating the input unit 34 to set a destination 52 (step S1). FIG. 4 shows a manner in which the route 53a and the destination 52 are displayed on the screen of the display unit 35. In response, the route storage unit 43 stores the destination 52 and, for example, the current position detected by the current position detector 18 as the starting point 51 (step S2). Specifically, position coordinates of the starting point 51 and the destination 52 are stored in the route storage unit 43. When the vehicle starts traveling, the route storage unit 43 starts to measure the elapsed time and starts to trace actual running route 53a, and the route 53a is recorded based on the tracing of the actual running route 53a of the vehicle (step S3).

When the vehicle arrives at the destination 52 (step S4=Yes), the route storage unit 43 stops measuring the elapsed time and stops recording the route 53a (step S5). The user is then prompted to select whether to store the route 53a as a registered route in the route bank (step S6). For example, a message asking whether to store the route 53a as a registered route in the route bank and selection buttons "store" and "not select" for specifying whether to store the route 53a are displayed on the screen of the display unit 35. In order to allow the user to easily make a selection, the route 53a along which the vehicle has traveled may also be displayed on the screen of the display unit 35, as shown in FIG. 4. The elapsed time to travel along the route 53a may also be displayed. The user selects the selection button "store" or "not select" by operating the operation key of the input unit 34.

If the user selects the "select" button (step S6=Yes), the route storage unit 43 stores the route 53a as a registered route 53 in the route bank together with the starting point 51, destination 52, and the elapsed time as a travel time (step S7). On the other hand, if the user selects the "not select" button (step S6=No), the route storage unit 43 deletes the recorded data of the route 53a, the starting point 51, the destination 52, and the elapsed time (step S8).

The route storage unit 43 can also store a route detected in searching by the route search unit 42 in the route bank as a registered route 53. Furthermore, the route storage unit 43 can also store a route along which the vehicle runs daily or a route taken more frequently than a predetermined number of times in the route bank as a registered route 53.

Figure 1A:
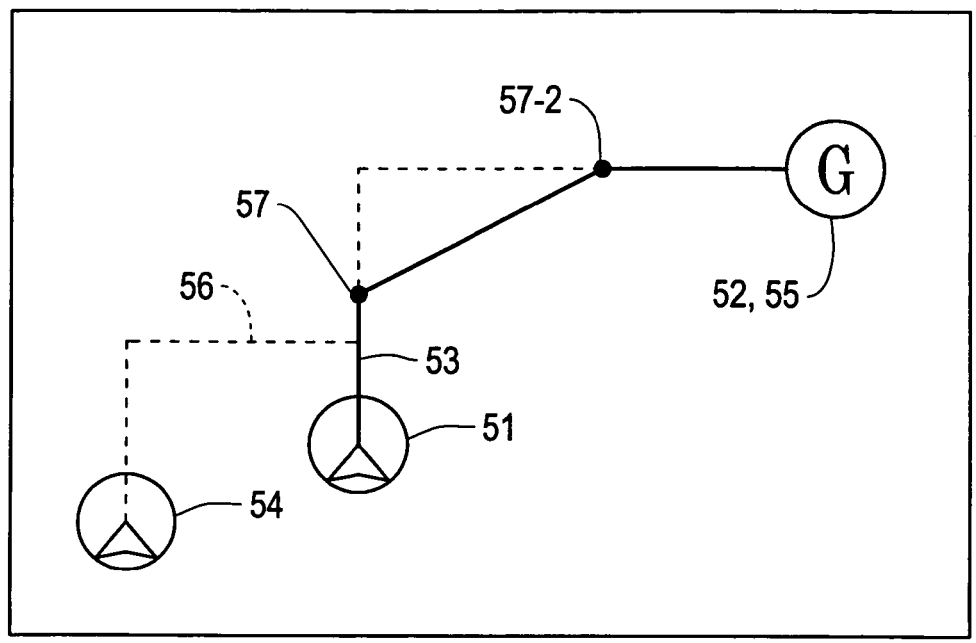
FIGS. 1A and 1B are diagrams showing a process performed by a vehicle navigation apparatus to set a registered route to a destination as a navigation route, according to a first exemplary embodiment of the invention.
Figure 1B:
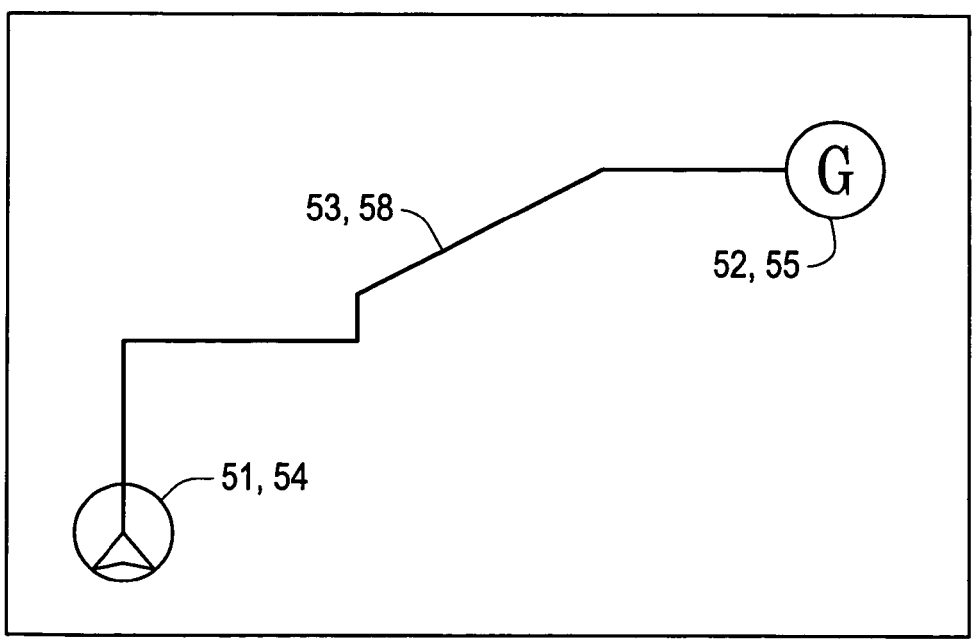
Figure 6:
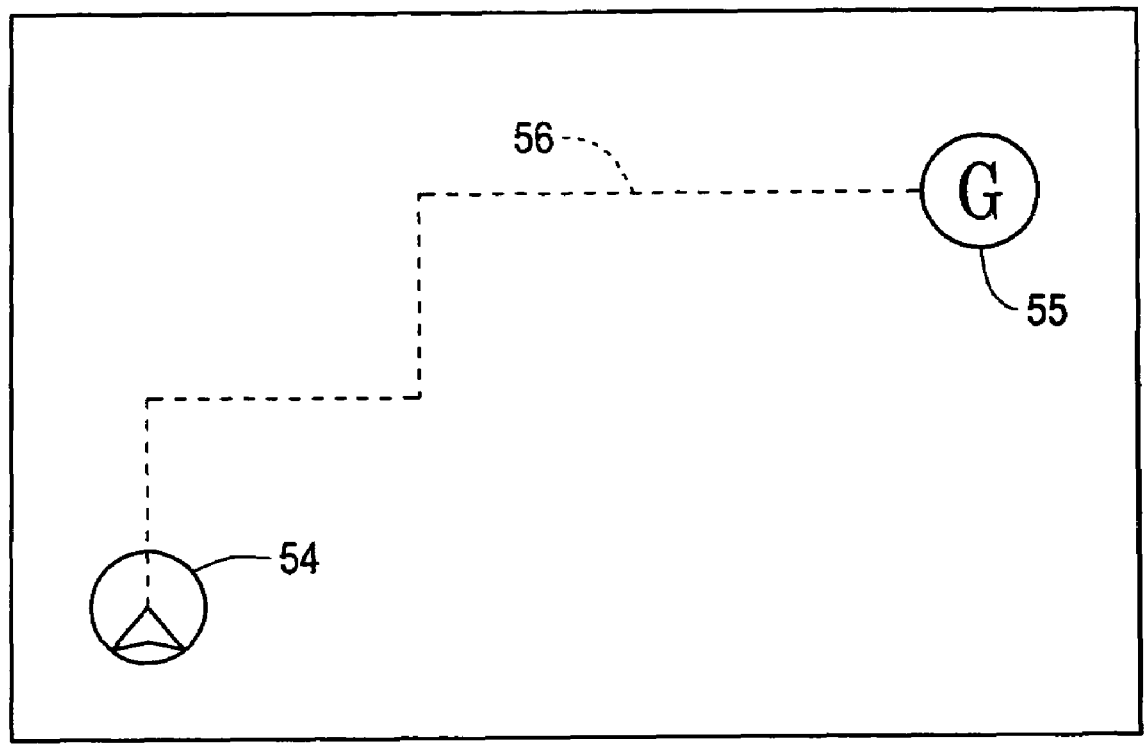
FIG. 6 is a diagram showing an example of a route detected via a searching process performed by the vehicle navigation apparatus according to the first exemplary embodiment of the invention.
Figure 7:
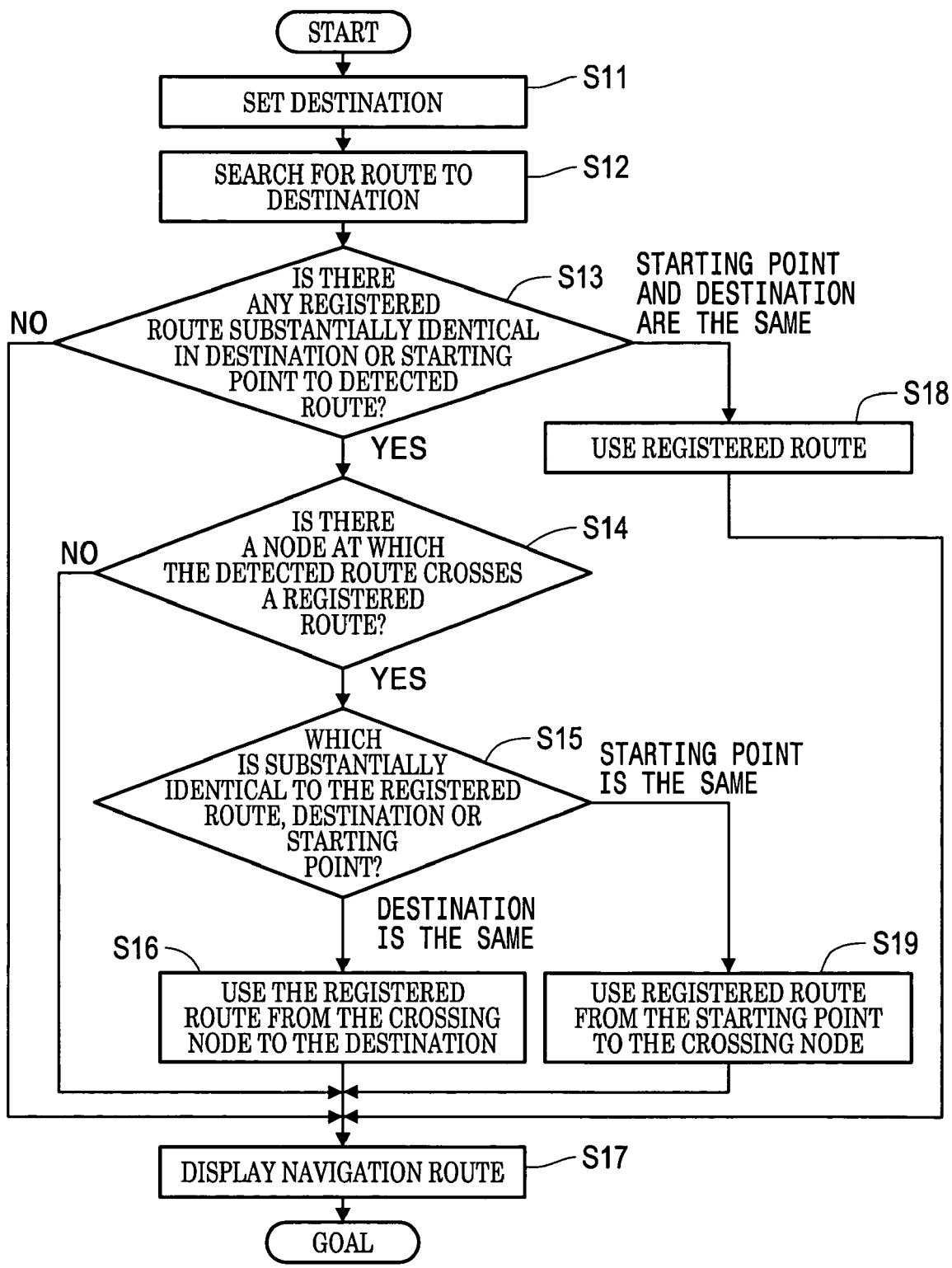
FIG. 7 is a flow chart showing a process performed by the vehicle navigation apparatus to set a registered route to a destination as a navigation route, according to a second exemplary embodiment of the invention.

A process is described below for a case in which there is a registered route whose starting point or destination is substantially identical to that of a detected route and the registered route is set as a navigation route with reference to FIGS. 1A, 1B, 6 and 7. FIGS. 1A and 1B are diagrams showing a process performed by the vehicle navigation apparatus to set a registered route to a destination as a navigation route, according to the first exemplary embodiment of the invention. FIG. 6 is a diagram showing an example of a route detected via a searching process performed by the vehicle navigation apparatus according to the first exemplary embodiment of the invention. FIG. 7 is a flow chart showing a process performed by the vehicle navigation apparatus to set a registered route to a destination as a navigation route, according to the first exemplary embodiment of the invention.

First, as shown by way of example in FIG. 6, the user or the driver of the vehicle sets a destination 55 by operating the input unit 34 so that a route 56 to the destination 55 can be searched for on the basis of the specified destination 55. FIG. 6 shows a manner in which information is displayed on the screen of the display unit 35. In response, the route search unit 42 sets, for example, the current position of the vehicle detected by the current position detector 18 as the starting point 54, and searches for a route 56 from this starting point 54 to the specified destination 55.

Thereafter, the route comparison unit 44 compares a route 56 detected in the above searching process by the route search unit 42 with registered routes stored in the route bank to determine whether there is a registered route whose starting point 51 or destination 52 is substantially identical to the starting point 54 or the destination 55 of the detected route 56. If the route comparison unit 44 determines that there is a registered route 53 whose starting point 51 and destination 52 are substantially identical to the starting point 54 and the destination 55, respectively, of the detected route 56, the navigation route setting unit 45 sets the registered route 53 as a navigation route 58 as shown in FIG. 1B. Thus, the registered route that is a more suitable route for the user than the detected route 56 is employed as the navigation route 58 from the starting point 51, 54 to the destination 52, 55. The navigation route 58 is displayed on the screen of the display unit 35, and route navigation/guidance is performed along the navigation route 58.

However, in the case in which the route comparison unit 44 determines that there is no registered route 53 whose starting point 51 or destination 52 is substantially identical to the starting point 54 or the destination 55 of the detected route 56, the navigation route setting unit 45 sets the detected route 56 as the navigation route 58. The navigation route 58 is displayed on the screen of the display unit 35, and route navigation/guidance is performed along the navigation route 58.

On the other hand, if the route comparison unit 44 determines that there is a registered route 53 whose starting point 51 or destination 52 is substantially identical to the starting point 54 or the destination 55 of the detected route 56, the route comparison unit 44 further determines whether there is a node, such as a node 57 shown in FIG. 1A, that is common to both the registered route 53 and the detected route 56 (i.e., whether there is a point at which the detected route 56 and the registered route 53 cross each other). If it is determined that there is no node (such as common node 57) common to both the registered route 53 and the detected route 56, the navigation route setting unit 45 sets the detected route 56 as the navigation route 58. Thereafter, the navigation route 58 is displayed on the screen of the display unit 35, and route navigation/guidance is performed along the navigation route 58.

On the other hand, if it is determined that there is a node included in common in both the registered route 53 and the detected route 56, the route comparison unit 44 determines whether the starting points 51 and 54 are substantially identical to each other or the destination points 52 and 55 are substantially identical to each other. If the route comparison unit 44 determines that the destination 52 of the registered route 53 and the destination 55 of the detected route 56 are substantially identical to each other, as is the case in the example shown in FIG. 1A, the navigation route setting unit 45 sets the navigation route 58 as shown in FIG. 1B such that the registered route 53 is utilized from the common node 57 to the destination 52, 55 and the detected route 56 is employed from the starting point 54 to the node 57. Thereafter, the route 56 is displayed on the screen of the display unit 35 from the starting point 54 to the node 57 and route navigation/guidance is performed along the route 56, while the registered route 53 that is a more suitable route for the user is displayed on the screen of the display unit 35 from the node 57 to the destination 52, 55 and route navigation/guidance is performed along the registered route 53.

If two or more nodes 57 are common to the two routes 53 and 56, as is the case in the example shown in FIG. 1A in which nodes 57 and 57-2 are common to the two routes 53 and 56, the navigation route setting unit 45 detects a node 57 that is the farthest from the common destination 52, 55 as measured along the registered route 53, and sets the navigation route 58 such that the registered route 53 is utilized from the detected common node 57 to the destination 52, 55.

If the route comparison unit 44 determines that the starting points 51 and 54 are substantially identical to each other, the navigation route setting unit 45 sets the navigation route 58 such that the registered route 53 is employed from the starting point 51, 54 to the common node 57, and the detected route 56 is utilized from the common node 57 to the destination 55. In this case, from the starting point 51, 54 to the common node 57, the registered route 53 that is a more suitable route for the user is displayed on the screen of the display unit 35 and the route navigation/guidance is performed along the registered route 53, while the detected route 56 is utilized from the node 57 to the destination 55 and is displayed on the screen of the display unit 35 and the route navigation/guidance is performed along the route 56.

If two or more nodes 57 are common to the two routes, the navigation route setting unit 45 detects a node 57 that is the farthest from the common starting point 51, 54 as measured along the registered route 53, and sets the navigation route 58 such that the registered route 53 is employed from the starting point 51, 54 to the detected common node 57.

The process is described further with reference to the flow chart shown in FIG. 7. First, in step S11, a destination 55 is set. Then, in step S12, a route 56 to the destination 55 is searched for. In step S13, it is determined whether there is a registered route 53 whose starting point 51 or destination 52 is substantially identical to the starting point 54 or the destination 55 of the detected route 56. If it is determined that there is a registered route 53 whose starting point 51 or destination 52 is substantially identical to the starting point 54 or the destination 55 of the detected route 56, the process proceeds to step S14. However, if it is determined that there is no registered route 53 whose starting point 51 or destination 52 is substantially identical to the starting point 54 or the destination 55 of the detected route 56, the process jumps to step S17. If it is determined that there is a registered route 53 whose starting point 51 and destination 52 are substantially identical to the starting point 54 and the destination 55, respectively, of the detected route 56, the process jumps to step S18.

In step S14, it is determined whether there is a node 57 at which the detected route 56 and the registered route 53 cross each other. If it is determined that there is a node 57 at which the detected route 56 and the registered route 53 cross each other, the process proceeds to step S15. However, if it is determined that there is no node 57 at which the detected route 56 and the registered route 53 cross each other, the process jumps to step S17.

In step S15, it is determined whether the starting points 51 and 54 are substantially identical to each other or the destination points 52 and 55 are substantially identical to each other. If it is determined that the starting points 51 and 54 are substantially identical to each other, the process jumps to step S19. On the other hand, if it is determined that destination points 52 and 55 are substantially identical to each other, the process proceeds to step S16. In step S16, the navigation route 58 is set such that the registered route 53 is employed from the crossing node 57 to the destination 52, 55. Then, in step S17, the navigation route 58 is displayed, and the process is ended. In step S18, the registered route 53 is set as the navigation route 58. In step S19, the navigation route 58 is set such that the registered route 53 is employed from the starting point 51, 54 to the crossing node 57.

According to the first exemplary embodiment, as described above, when the route comparison unit 44 determines that there is a registered route 53 whose starting point 51 or destination 52 is substantially identical to the starting point 54 or the destination 55 of the detected route 56, and there is a node 57 that is common to both routes 53 and 56, the navigation route 58 is set such that the registered route 53 is employed from the common starting point 51, 54 to the common node 57 or from the common node 57 to the common destination 52, 55. Thus, when there is a registered route 53 whose starting point 51 or destination 52 is substantially identical to the starting point 54 or the destination 55 of the detected route 56, at least a part of the registered route 53 including the common starting point 51, 54 or the common destination 52, 55 is employed as the navigation route 58. Thus, the route that is more suitable for the user is employed as the navigation route 58.

For example, when a route from a remote place to a user's home is searched for, a navigation route is set such that in an area near the user's home a route that needs a shortest time or a route that meets a user's particular preference is selected from registered routes 53 that have been selected as suitable routes by the user and stored in the route bank. On the other hand, for example, when a route from the user's home to a remote place is searched for, a navigation route is set such that in an area near the user's home a route that needs a shortest time or a route that meets a user's particular preference is selected from registered routes 53 that have been selected as suitable routes by the user and stored in the route bank.

Thus, in an area that is well known by the user in terms of actual traffic conditions, such as, for example, the degree of traffic congestion, waiting times at traffic signals, road widths, obstructions in view, rough numbers of pedestrians, and the degree of ease of driving on roads, a route most suitable for the user is selected as the navigation route 58.

This allows the user to drive his/her vehicle, relying on a navigation route presented by the vehicle navigation apparatus 15, and thus the vehicle navigation apparatus 15 becomes very useful for the user.

A second exemplary embodiment of the invention is described below with reference to FIGS. 8-11. In this second exemplary embodiment, similar parts to those in the first exemplary embodiment are denoted by similar reference numerals, and a description thereof is omitted. Operations and advantages similar to those in the first exemplary embodiment are also omitted.

Figure 8:
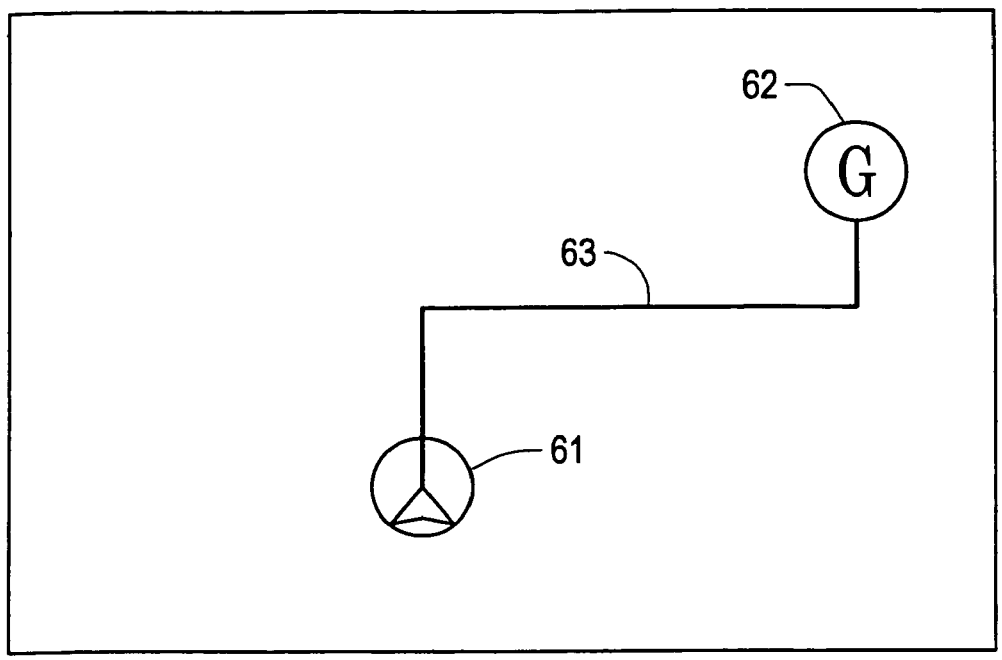
FIG. 8 is a diagram showing a registered route stored in the vehicle navigation apparatus according to the second exemplary embodiment of the invention.
Figure 9:
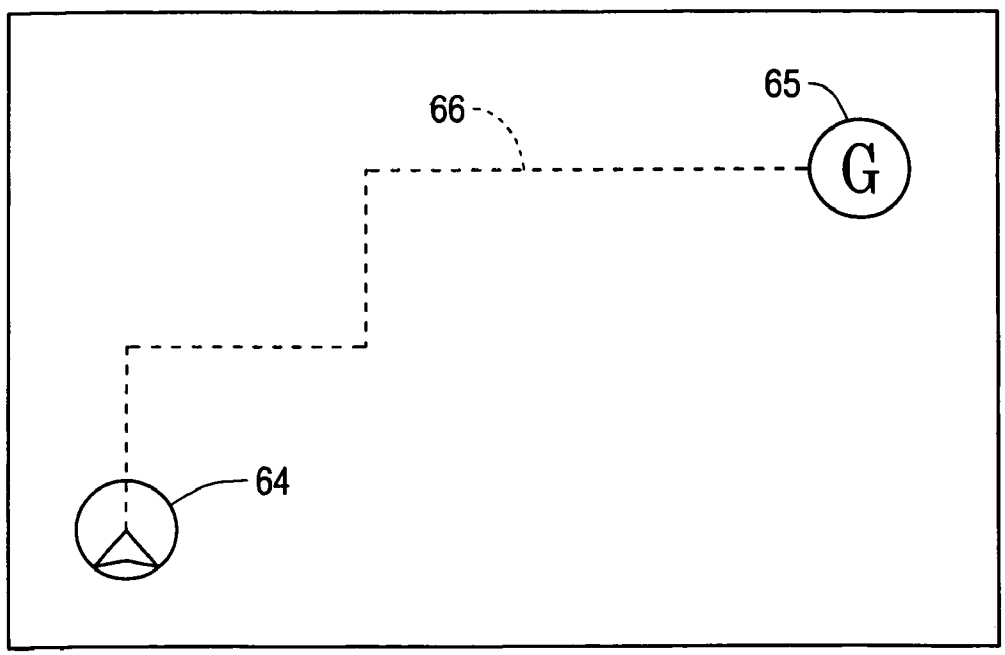
FIG. 9 is a diagram showing an example of a route detected via a searching process performed by the vehicle navigation apparatus according to the second exemplary embodiment of the invention.
Figure 10A:
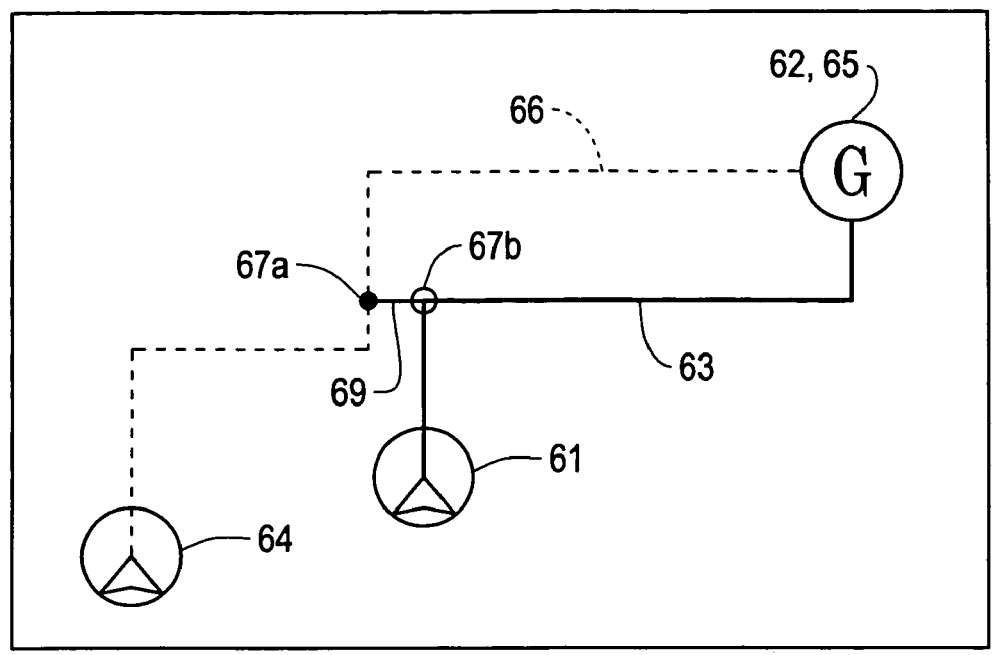
FIGS. 10A and 10B are diagrams showing a process performed by a vehicle navigation apparatus to set a registered route to a destination as a navigation route, according to the second exemplary embodiment of the invention.
Figure 10B:
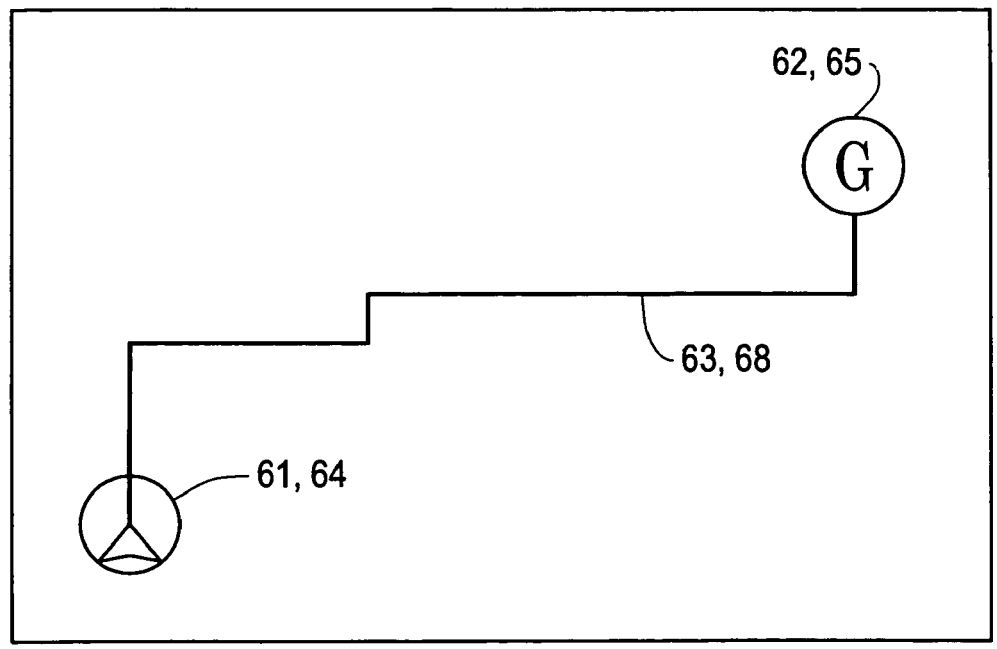
Figure 11:
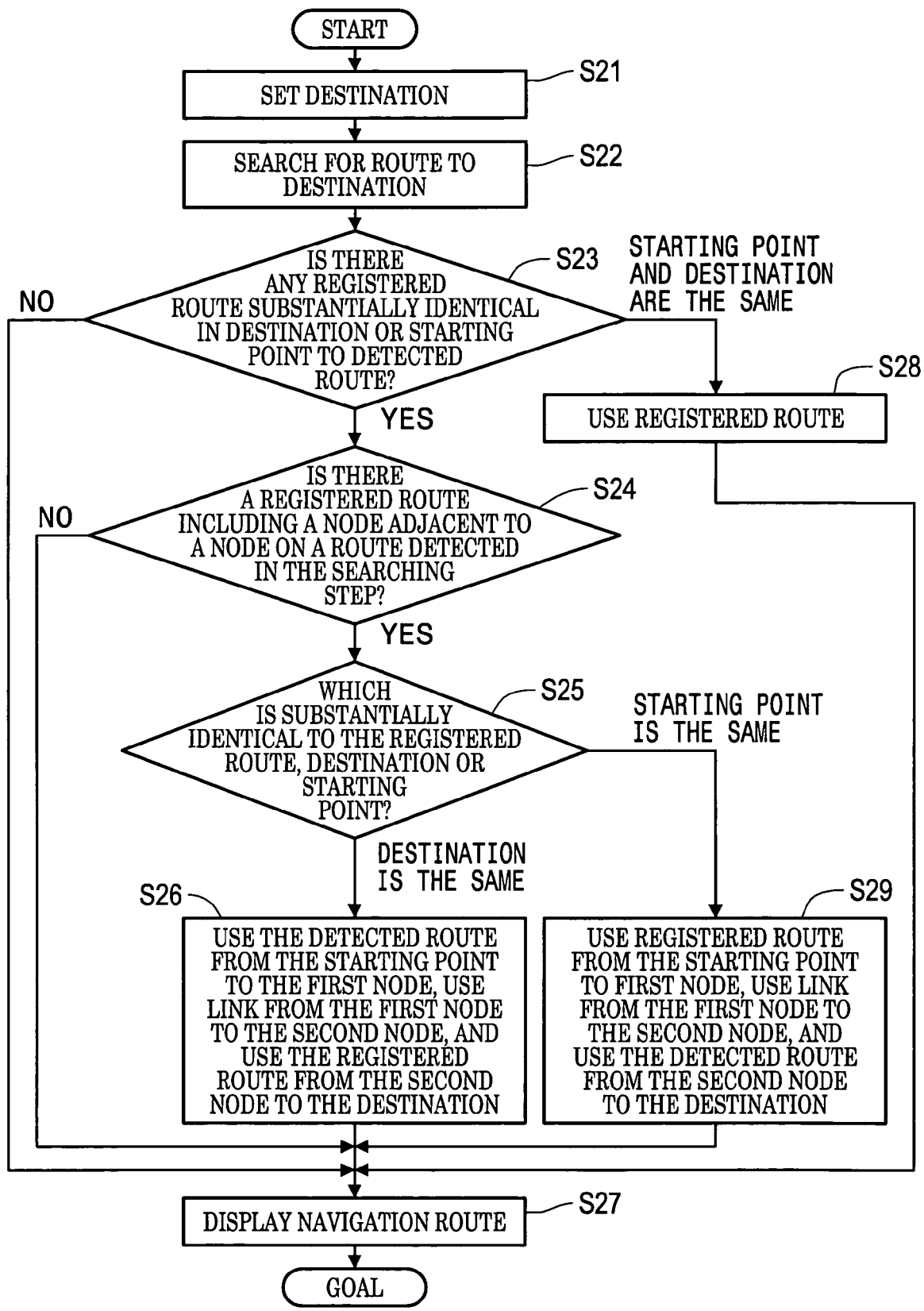
FIG. 11 is a flow chart showing a process performed by a vehicle navigation apparatus to set a registered route to a destination as a navigation route, according to the second exemplary embodiment of the invention.

FIG. 8 is a diagram showing a registered route stored in the vehicle navigation apparatus according to the second exemplary embodiment of the invention. FIG. 9 is a diagram showing an example of a route detected via a searching process performed by the vehicle navigation apparatus according to the second exemplary embodiment of the invention. FIGS. 10A and 10B are diagrams showing a process performed by a vehicle navigation apparatus to set a registered route to a destination as a navigation route, according to the second exemplary embodiment of the invention. FIG. 11 is a flow chart showing a process performed by a vehicle navigation apparatus to set a registered route to a destination as a navigation route, according to the second exemplary embodiment of the invention.

According to the second exemplary embodiment, if a route detected in the searching process includes a node adjacent to a node of a registered route, the navigation route setting unit 45 sets the navigation route such that the registered route is employed from a starting point or a destination to the node. For example, the first route comparison unit 44 determines whether there is a registered route whose starting point or destination is substantially identical to that of the detected route. Next, if such a registered route is found, the route comparison unit 44 further determines whether the registered route includes a node adjacent to a node included in the detected route. Thus, according to the second exemplary embodiment, if there is a registered route whose starting point or destination is substantially identical to that of a route detected in the searching process, a part of the registered route is employed as the navigation route if that registered route includes a node adjacent to a node included in the detected route, even if there is no node common to both the detected route and the registered route. Herein, it is assumed that a registered route 63 from a starting point 61 to a destination 62, such as that shown in FIG. 8, has been already stored in the route bank. FIG. 8 shows an example of a registered route 63 displayed in the screen of the display unit 35.

First, as shown by way of example in FIG. 9, the user or the driver of the vehicle sets a destination 65 by operating the input unit 34 so that a route 66 to the destination 65 can be searched for on the basis of the specified destination 65. FIG. 9 shows an example of a route 66 detected in the searching process and displayed on the screen of the display unit 35. In response, the route search unit 42 sets the current position of the vehicle, for example, detected by the current position detector 18 as the starting point 64, and searches for a route 66 from this starting point 64 to the specified destination 65.

Thereafter, the route comparison unit 44 determines whether there is a registered route 63 whose starting point 61 or destination 62 is substantially identical to the starting point 64 or the destination 65 of the detected route 66, by comparing the detected route 66 with registered routes 63 stored in the route bank. If the route comparison unit 44 determines that there is a registered route 63 whose starting point 61 and destination 62 are substantially identical to the starting point 64 and the destination 65, respectively, of the detected route 66, the navigation route setting unit 45 sets the registered route 63 as the navigation route 68 as shown in FIG. 10B. Thus, the registered route 63 that is a more suitable route for the user than the route 66 detected in the searching process is employed as the navigation route 68 from the starting point 61, 64 to the destination 62, 65, and the navigation route 68 is displayed on the screen of the display unit 35 and route navigation/guidance is performed along the navigation route 68.

However, in the case in which the route comparison unit 44 determines that there is no registered route 63 whose starting point 61 or destination 62 is substantially identical to the starting point 64 or the destination 65 of the route 66 detected in the searching process, the navigation route setting unit 45 sets the detected route 66 as the navigation route 68, and the navigation route 68 is displayed on the screen of the display unit 35 and route navigation/guidance is performed along the navigation route 68.

On the other hand, in the case in which the route comparison unit 44 determines that there is a registered route 63 whose starting point 61 or destination 62 is substantially identical to the starting point 64 or the destination 65 of the detected route 66, the route comparison unit 44 further determines whether the registered route 63 includes a node, such as a node 67*b* in the example shown in FIG. 10A, adjacent to a node, such as a node 67*a*, included in the detected route 66. That is, the route comparison unit 44 determines whether the detected route 66 and the registered route 63 are adjacent to each other via some link.

Note that "adjacent nodes" as used herein refers to nodes located, for example, at respective ends of a predetermined number of links. Nodes may be set at least at respective intersections and branch points, and as many links are connected to each node as there are roads joining the intersection or the branch point corresponding to that node. For example, in the case of a cross intersection, four links corresponding to four roads joining the cross intersection are connected to a node corresponding to the cross intersection. Therefore, when the detected route 66 includes an intersection or a branch point, links other than links included in the route 66 are also connected to a node corresponding to the intersection or the branch point.

The route comparison unit 44 examines all of the nodes included in the detected route 66 to determine whether one or more links other than the links on the detected route 66 is/are connected with each node. If such a link connected to a node on the detected route 66 is found, the route comparison unit 44 determines whether a node at the opposite end of that link is on the registered route 63. If the node at the opposite end is on the registered route 63, it is determined that the detected route 66 and the registered route 63 include nodes 67*a* and 67*b*, respectively, which are adjacent to each other.

If the route comparison unit 44 determines that the registered route 63 includes no adjacent nodes (such as a node 67*b* adjacent to node 67*a*) on the detected route 66, the navigation route setting unit 45 employs the detected route 66 as the navigation route 68. The navigation route 68 determined in the above-described manner is displayed on the screen of the display unit 35 and route navigation/guidance is performed along the navigation route 68.

On the other hand, if the route comparison unit 44 determines that the registered route 63 includes a node, such as node 67*b* adjacent to node 67*a* on the route detected 66, the route comparison unit 44 further determines whether the starting points 61 and 64 are substantially identical to each other or the destination points 62 and 65 are substantially identical to each other. If the route comparison unit 44 determines that the destination points 62 and 65 are substantially identical to each other as is the case in the example shown in FIG. 10A, the navigation route setting unit 45 sets the navigation route 68 similar to the route shown in FIG. 10B such that the registered route 63 is utilized from the node 67b to the common destination 62, 65, a road corresponding to the link 69 between the nodes 67a and 67b is utilized from the node 67a to the node 67b, and the detected route 66 is utilized from the starting point 64 to the node 67a. Thus, the detected route 66 is displayed on the screen of the display unit 35 from the starting point 64 to the node 67a and route navigation/guidance is performed along the detected route 66, while the registered route 63 that is a more suitable route for the user is displayed on the screen of the display unit 35 from the node 67b to the destination 62, 65 and route navigation/guidance is performed along the registered route 63.

If there are two or more sets of adjacent nodes 67a and 67b, the navigation route setting unit 45 detects a node set including a node 67b that is the farthest from the common destination 62, 65 as measured along the registered route 63 and sets the navigation route 68 such that the registered route 63 is utilized from the detected node 67b to the destination 62, 65.

If the route comparison unit 44 determines that the starting points 61 and 64 are substantially identical to each other, the navigation route setting unit 45 sets the navigation route 68 such that the registered route 63 is utilized from the starting point 61, 64 to the node 67a, a road corresponding to the link 69 between the nodes 67a and 67b is utilized from the node 67a to the node 67b, and the detected route 66 is utilized from the node 67b to the destination 65. Thus, from the starting point 61, 64 to the node 67a, the registered route 63 that is a more suitable route for the user is displayed on the screen of the display unit 35 and the route navigation/guidance is performed along the registered route 63, while from the node 67b to the destination 65, the detected route 66 is displayed on the screen of the display unit 35 and the route navigation/guidance is performed along the detected route 66.

If there are two or more sets of adjacent nodes 67a and 67b, the navigation route setting unit 45 detects a node set including a node 67a that is the farthest from the common starting point 61, 64 as measured along the registered route 63, and sets the navigation route 68 such that the registered route 63 is employed from the starting point 61, 64 to the node 67a.

The process is described further with reference to the flow chart shown in FIG. 11. First, in step S21, a destination 65 is set. Then, in step S22, a route 66 to the destination 65 is searched for. In step S23, it is determined whether there is a registered route 63 whose starting point 61 or destination 62 is substantially identical to the starting point 64 or the destination 65 of the detected route 66. If it is determined that there is a registered route 63 whose starting point 61 or destination 62 is substantially identical to the starting point 64 or the destination 65 of the detected route 66, the process proceeds to step S24. However, if it is determined that there is no registered route 63 whose starting point 61 or destination 62 is substantially identical to the starting point 64 or the destination 65 of the detected route 66, the process jumps to step S27. If it is determined that there is a registered route 63 whose starting point 61 and destination 62 are substantially identical to the starting point 64 and the destination 65, respectively, of the detected route 66, the process jumps to step S28.

In step S24, it is determined whether the registered route 63 includes a node adjacent to a node on the detected route 66. If it is determined that the registered route 63 includes a node adjacent to a node on the detected route 66, the process proceeds to step S25. However, if it is determined that the registered route 63 includes no node adjacent to a node on the detected route 66, the process jumps to step S27.

In step S25, it is determined whether the starting points 61 and 64 are substantially identical to each other or the destination points 62 and 65 are substantially identical to each other. If it is determined that the starting points 61 and 64 are substantially identical to each other, the process jumps to step S29. If it is determined that destination points 62 and 65 are substantially identical to each other, the process proceeds to step S26.

In step S26, the navigation route 68 is set such that the detected route 66 is utilized from the starting point 64 to the node 67a, the link 69 is utilized from the node 67a to the node 67b, and the registered route 63 is utilized from the node 67b to the destination 62, 65. In step S27, the navigation route 68 is displayed, and the process is ended.

In step S28, the registered route 63 is set as the navigation route 68. In step S29, the navigation route 68 is set such that the registered route 63 is utilized from the starting point 61, 64 to the node 67a, the link 69 is utilized from the node 67a to the node 67b, and the detected route 66 is utilized from the node 67b to the destination 65.

According to the second exemplary embodiment, as described above, when the route comparison unit 44 determines that there is a registered route 63 whose starting point 61 or destination 62 is substantially identical to the starting point 64 or the destination 65 of the detected route 66, and the registered route 63 includes a node 67b adjacent to a node 67a on the detected route 66, the navigation route 68 is set such that the registered route 63 is employed from the common starting point 61, 64 to the node 67a or from the node 67b to the common destination 62, 65. That is, if there is a registered route 63 whose starting point 61 or destination 62 is substantially identical to the starting point 64 or the destination 65 of the route 66 detected in the searching process, at least a part of the registered route 63 including the common starting point 61, 64 or the common destination 62, 65 is employed as the navigation route 68. Thus, the route that is more suitable for the user is employed as the navigation route 68.

According to the second exemplary embodiment, unlike the first embodiment described earlier in which a registered route 63 is employed as a navigation route 68 only when the registered route 63 includes a node that is also included in a detected route 66, at least a part of the registered route 63 including the common starting point 61, 64 or the common destination 62, 65 is utilized as the navigation route 68 if the registered route 63 and the detected route 66 are adjacent to each other via some link. This results in an increased probability that a registered route 63 that has been selected in advance as a suitable route by the user and stored in the route bank will be utilized in the determination of a navigation route. This allows the user to drive his/her vehicle, relying on a navigation route presented by the vehicle navigation apparatus 15, and the vehicle navigation apparatus 15 becomes more useful for the user.

A third exemplary embodiment of the invention is described below with reference to FIGS. 12A-14. In this third exemplary embodiment, similar parts to those in the first exemplary embodiment and second exemplary embodiment are denoted by similar reference numerals, and a duplicated description thereof is omitted. Operations and advantages similar to those in the first exemplary embodiment and second exemplary embodiment are also omitted.

Figure 12A:
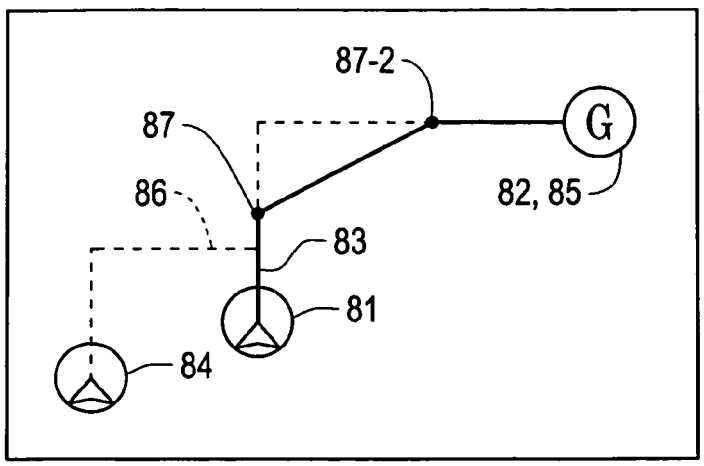
FIGS. 12A-12C are diagrams showing a process performed by a vehicle navigation apparatus to set a registered route to a destination as a navigation route, according to a third exemplary embodiment of the invention.
Figure 12B:
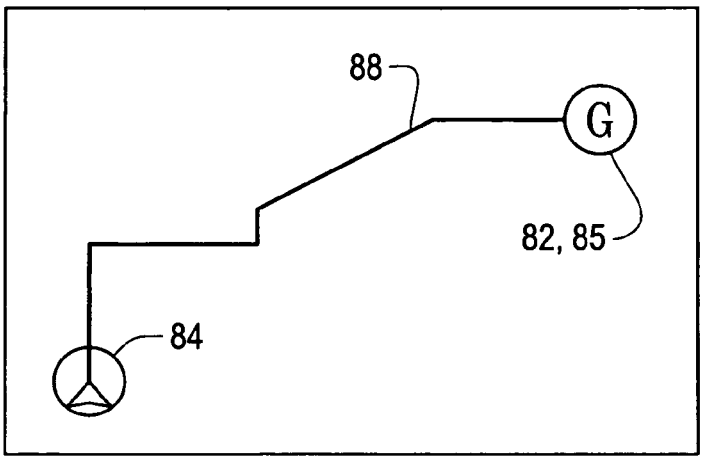
Figure 12C:
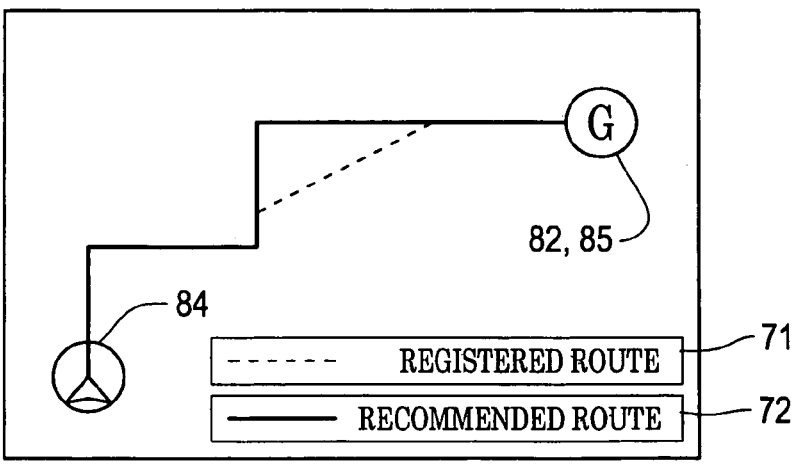
Figure 13:
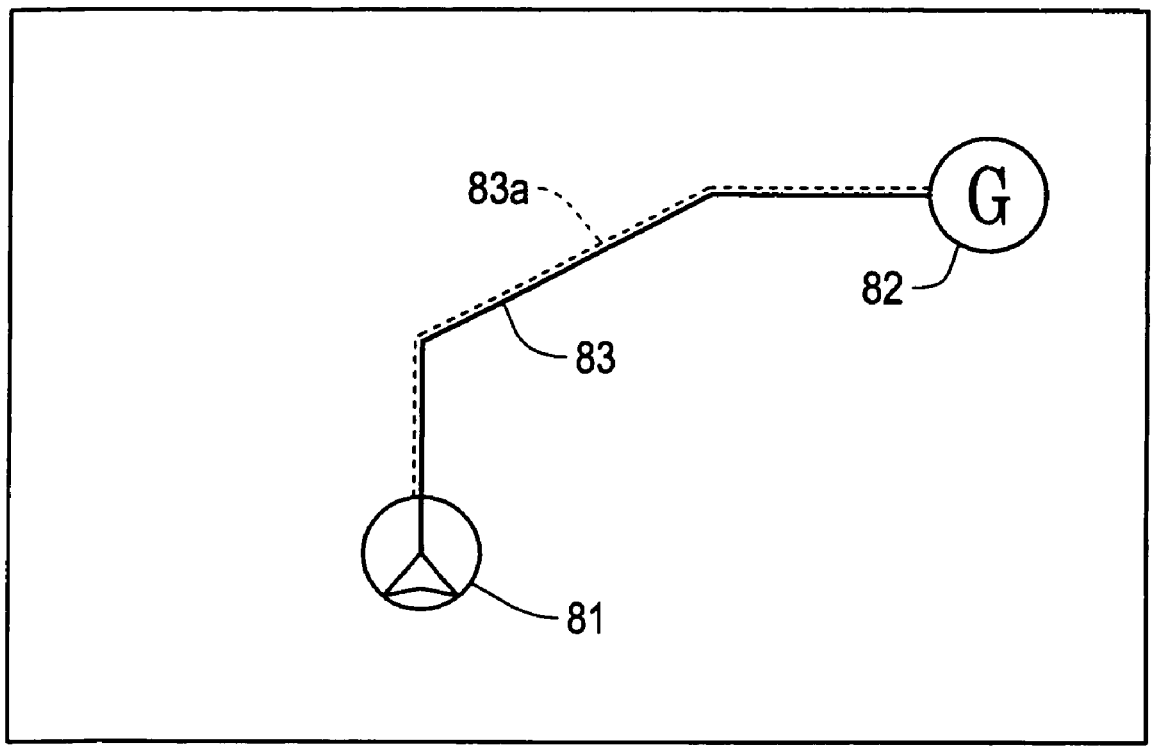
FIG. 13 is a diagram showing a registered route stored in the vehicle navigation apparatus according to the third exemplary embodiment of the invention.
Figure 14:
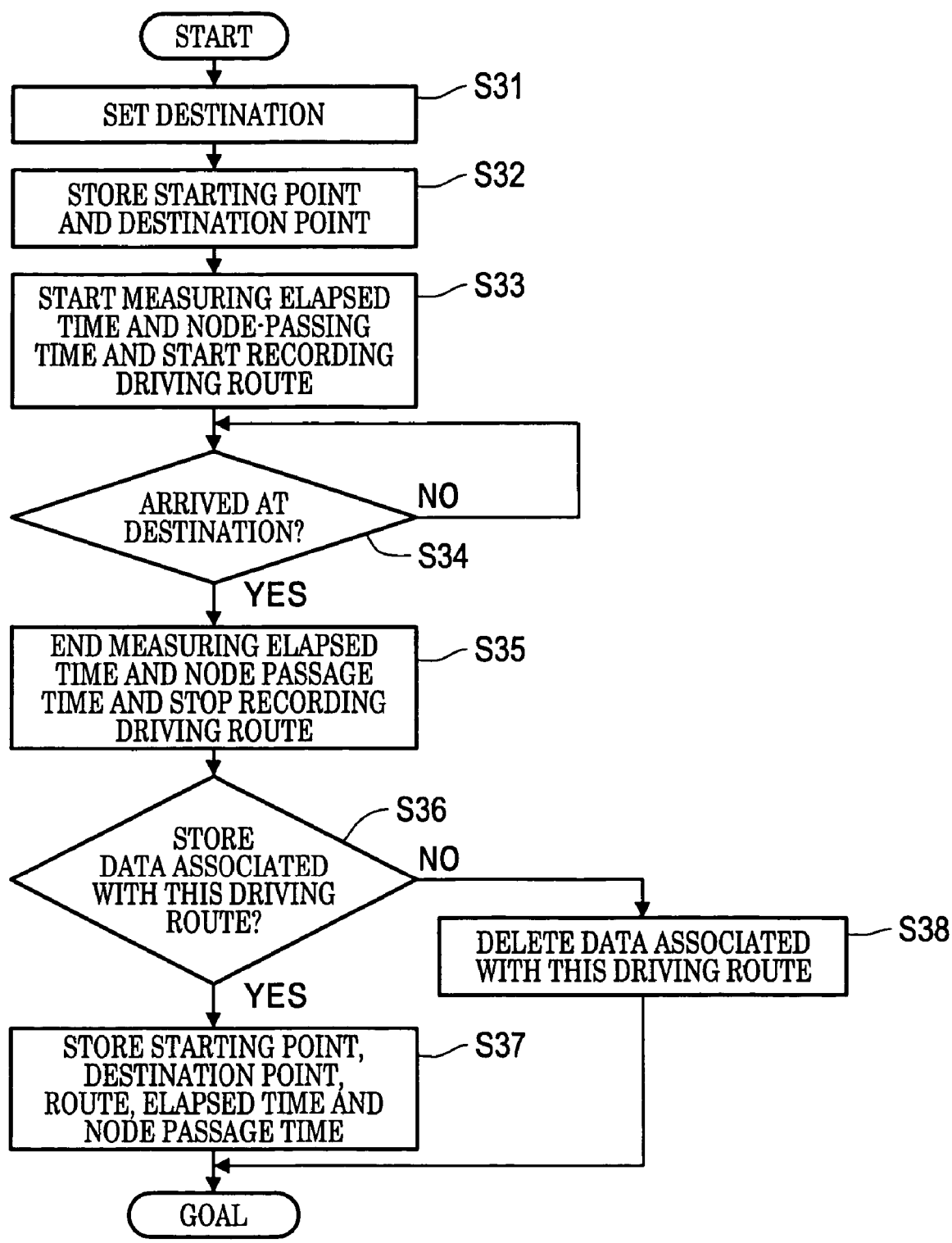
FIG. 14 is a flow chart showing a process performed by the vehicle navigation apparatus to store a route as a registered route into a route bank, according to the third exemplary embodiment of the invention.

FIGS. 12A-12C are diagrams showing a process performed by a vehicle navigation apparatus to set a registered route to a destination as a navigation route, according to the third exemplary embodiment of the invention. FIG. 13 is a diagram showing a registered route stored in the vehicle navigation apparatus according to the third exemplary embodiment of the invention. FIG. 14 is a flow chart showing a process performed by the vehicle navigation apparatus to store a route as a registered route into a route bank, according to the third exemplary embodiment of the invention.

According to the third exemplary embodiment, the route storage unit 43 stores not only the elapsed travel time and the running route 83*a* but also the time at which each node is passed along the route. For example, in FIG. 13, the user or the driver of the vehicle prepared for recording the route 83*a* to the destination 82 by operating the input unit 34 to set a destination 82 (step S31). FIG. 13 shows an example of a manner in which the route 83*a* and the destination 82 are displayed on the screen of the display unit 35. In response, the route storage unit 43 stores the destination 82 and the current position detected by the current position detector 18 as the starting point 81 (step S32). Specifically, position coordinates of the starting point 81 and the destination 82 are stored in the route storage unit 43. If the vehicle starts driving the route storage unit 43 starts measuring the elapsed time and the time at which each node is passed and also starts tracing of a running route 83*a* (step S33), The route 83*a* is recorded based on the tracing of the actual running route of the vehicle.

When the vehicle arrives at the destination 82 (step S37, Yes), the route storage unit 43 stops measuring the elapsed time and the node passage time and also stops recording the running route 83*a* (step S35). The user is prompted to determine whether to store the route 83*a* taken this time as a registered route in the route bank (step S36). Specifically, a message asking whether to store the traveled route 83*a* as a registered route in the route bank and selection buttons "store" and "not select" for specifying whether to store the route 83*a* are displayed on the display unit 35. In order to allow the user to easily make a selection, the traveled route 83*a* may also be displayed on the screen of the display unit 35, as shown in FIG. 13. The elapsed travel time along the route 83*a* may also be displayed. The user selects the selection button "store" or "not select" by operating the operation key of the input unit 34.

If the user selects the "select" button (step S36=Yes), the route storage unit 43 stores the traveled route 83*a* as a registered route 83 in the route bank together with the starting point 81, the destination 82, and the travel time, and the time at which each node along the traveled route 83*a* was passed. On the other hand, if the user selects the "not select" button (step S36=no), the route storage unit 43 deletes the recorded data associated with the traveled route 83*a*.

A process is described below for a case in which the registered route is set as a navigation route when there is a registered route whose starting point or destination is substantially identical to that of a route detected in the searching process according to the third exemplary embodiment. If it is determined that there is a node 87 common to both the registered route 83 and the detected route 86, the route comparison unit 44 further determines whether the starting points 81 and 84 are substantially identical to each other or the destination points 82 and 85 are substantially identical to each other. If the route comparison unit 44 determines that the destination 82 of the registered route 83 and the destination 85 of the detected route 86 are substantially identical to each other, as is the case in the example shown in FIG. 12A, the navigation route setting unit 45 makes a comparison between the predicted time at which the vehicle will pass through the common node 87 if the vehicle travels the detected route 86 and the recorded node passage time of the node 87 on the registered route 83 to determine whether the difference between them is less than the predetermined value, for example, 60 minutes. If the difference is less than the predetermined value, the navigation route setting unit 45 sets the navigation route 88 as shown in FIG. 12B such that the registered route 83 is utilized from the common node 87 to the destination 82, 85 and the detected route 86 is utilized from the starting point 84 to the common node 87.

If the difference between the predicted time at which the vehicle will pass through the common node 87 and the recorded node passage time of the common node 87 is equal to or greater than the predetermined value, the navigation route setting unit 45 displays a screen such as that shown in FIG. 12C on the display unit 35 to prompt the user to determine whether to select the registered route 83 as the navigation route 88. For example, a registered route selection button 71 for selecting the registered route 83 as the navigation route 88 and a recommended route selection button 72 for selecting the detected route 86 as the navigation route 88 may be displayed on the display screen. If the user selects the registered route selection button 71, the navigation route setting unit 45 sets the navigation route 88 as shown in FIG. 12B such that the registered route 83 is utilized from the common node 87 to the destination 82, 85 and the detected route 86 is utilized from the starting point 84 to the common node 87. If the user selects the recommended route selection button 72, the navigation route setting unit 45 sets the navigation route 88 such that the detected route 86 is utilized from the starting point 84 to the destination 82, 85. Thus, the route from the starting point 84 to the destination 82 (85) is properly selected by the user and displayed on the display screen of the display unit 35 thereby providing route navigation/guidance.

In a case in which two or more common nodes 87 are included in the two routes, as is the case in the example shown in FIG. 12A in which nodes 87 and 87-2 are common to the two routes, the navigation route setting unit 45 selects a node 87 with a smallest difference between predicted and recorded node passage times, from the two or more nodes 87 common in the registered route 83 from the starting point 84, and the navigation route setting unit 45 sets the navigation route 88 such that the registered route 83 is employed from the node 87 to the destination 82, 85.

In the case in which the route comparison unit 44 determines that the starting points 81 and 84 are substantially identical to each other, the navigation route is set in a similar manner to the case in which the destination 82 and the destination 85 are substantially identical to each other. That is, the navigation route setting unit 45 makes a comparison between the predicted time at which the vehicle will pass through the common node 87 if the vehicle travels the detected route 86 and the recorded node passage time of the common node 87 on the registered route 83 to determine whether the difference between them is less than the predetermined value. If the difference is less than the predetermined value, the navigation route setting unit 45 sets the navigation route 88 such that the registered route 83 is selected from the starting point 81, 84 to the common node 87, and the detected route 86 is employed from the node 87 to the destination 85.

If the difference between the predicted time at which the vehicle will pass through the common node 87 and the recorded time at which the common node 87 was passed through is equal to or greater than the predetermined value, the navigation route setting unit 45 prompts the user to determine whether to select the registered route 83 as the navigation route 88. Specifically, the registered route selection button 71 and the recommended route selection button 72 are displayed on the display screen of the display unit 35. If the user selects the registered route selection button 71, the navigation route setting unit 45 sets the navigation route 88 such that the registered route 83 is selected from the starting point 81, 84 to the common node 87, and the detected route 86 is utilized from the common node 87 to the destination 85. If the user selects the recommended route selection button 72, the navigation route setting unit 45 sets the navigation route 88 such that the detected route 86 is utilized from the starting point 81, 84 to the destination 85. Thus, the route from the starting point 81, 84 to the destination 85 is properly selected by the user and displayed on the display screen of the display unit 35 thereby providing route navigation/guidance.

In a case in which two or more nodes 87 are common the two routes, the navigation route setting unit 45 selects a node 87 with a smallest difference between predicted and recorded node passage times from the two or more nodes 87 common to the registered route 83 from the starting point 81, 84, and the navigation route setting unit 45 sets the navigation route 88 such that the registered route 83 is selected from the starting point 81, 84 to the selected node 87.

According to the present embodiment, as described above, when the route comparison unit 44 determines that there is a registered route 83 whose starting point 81 or destination 82 is substantially identical to the starting point 84 or the destination 85 of the detected route 86 and there is a node 87 common to both the registered route 83 and the detected route 86, the navigation route setting unit 45 makes a comparison between the predicted time at which the vehicle will pass through the common node 87 and the recorded time at which the common node 87 was passed through, to determine whether the difference between them is less than the predetermined value. Note that in the comparison of difference between predicted node passage time and recorded node passage time, either a node on the registered route 83 or a node on the detected route 86 may be employed. Also note that the node employed in the comparison may be a common starting point 81 or 84 or a common destination 82 or 85.

If the difference is less than the predetermined value or if the user selects the registered route 83 regardless of the value of the difference, the navigation route setting unit 45 sets the navigation route 88 such that the registered route 83 is utilized from the common starting point 81, 84 to the common node 87 or from the common node 87 to the common destination 82, 85. Thus, the route that is more suitable for the user is employed as the navigation route 88.

If there is a large difference between the predicted node passage time and the recorded node passage time on the registered route, the user is prompted to determine whether to select the registered route 83. This makes it possible for the user to select a suitable route as the navigation route even when the registered route 83 is a route that the user might only utilize in a special time zone such as, for example, a morning commuting time zone or a late night time zone.

Thus, in an area that is well known by the user in terms of time-varying actual traffic conditions, such as, for example, the degree of traffic congestion, waiting times at traffic signals, road widths, obstructions in view, rough numbers of pedestrians, and the degree of ease of driving on roads, a route most suitable for the user is selected as the navigation route 88. This allows the user to drive his/her vehicle, relying on a navigation route presented by the vehicle navigation apparatus 15, and thus the vehicle navigation apparatus 15 becomes very useful for the user.

A fourth embodiment of the present invention is described below with reference to FIGS. 15A-16. In this fourth embodiment, similar parts to those in the third embodiment are denoted by similar reference numerals, and a duplicated description thereof is not given herein. Operations and advantages similar to those in the third embodiment are also not described herein.

Figure 15A:
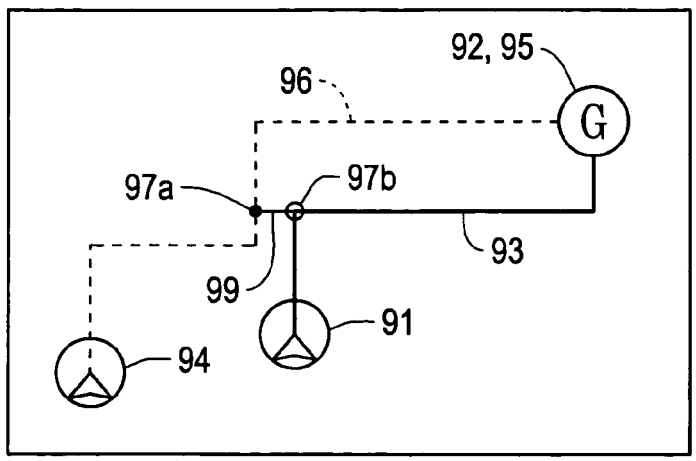
FIGS. 15A-15C are diagrams showing a process performed by a vehicle navigation apparatus to set a registered route to a destination as a navigation route, according to a fourth exemplary embodiment of the invention.
Figure 15B:
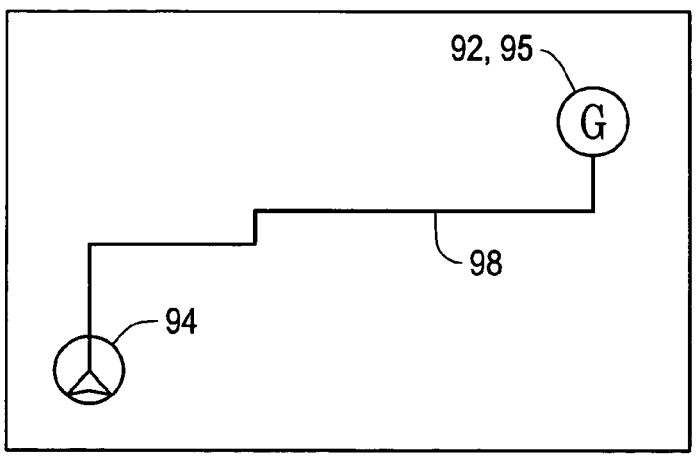
Figure 15C:
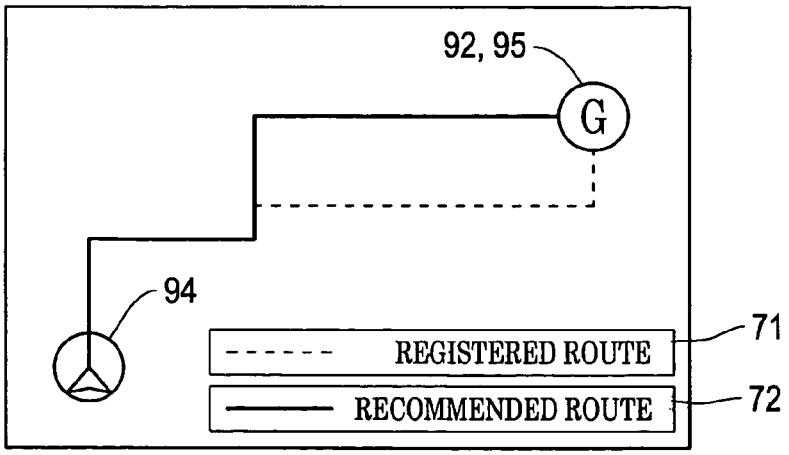

FIGS. 15A-15C are diagrams showing a process performed by a vehicle navigation apparatus to set a registered route to a destination as a navigation route, according to the fourth exemplary embodiment of the invention. FIG. 16 is a flow chart showing a process performed by the vehicle navigation apparatus to set a registered route to a destination as a navigation route, according to the fourth exemplary embodiment of the invention.

According to the fourth exemplary embodiment, the route comparison unit 44 determines whether there is a registered route whose starting point or destination is substantially identical to that of the route detected in the searching process. If there is such a registered route, then the route comparison unit 44 further determines whether the registered route includes a node adjacent to a node included in a detected route. Furthermore, based on the predicted node passage time on the detected route and the recorded node passage time of a node which is adjacent to the node on the detected route and which is on a registered route, the navigation route setting unit 45 determines whether the registered route from the starting point or the destination to the node on the registered route is employed as the navigation route.

That is, according to the present embodiment, if there is a registered route whose starting point or destination is substantially identical to that of a detected route, and if the registered route includes a node adjacent to a node in the detected route, the navigation route is set such that a part of the registered route is employed as the navigation route when the difference between the predicted node passage time of the adjacent node on the detected route and the recorded node passage time of the adjacent node on the registered route is less than the predetermined value, even if there is no node included in common in both the detected route and the registered route. The route setting unit will also set the navigation route such that a part of the registered route is employed as the navigation route when the difference between the predicted node passage time of the adjacent node on the detected route 96 and the recorded node passage time of the adjacent node on the regarded route is less than the predetermined value if the user selects the registered route as the navigation route although the difference is not less than the predetermined value.

If the route comparison unit 44 determines that the registered route 93 includes a node such as a node 97b adjacent to a node such as a node 97a on the detected route 96, the route comparison unit 44 further determines whether the starting points 91 and 94 are substantially identical to each other or the destination points 92 and 95 are substantially identical to each other. If the route comparison unit 44 determines that the destination points 92 and 95 are substantially identical to each other, as is the case in the example shown in FIG. 15A, the navigation route setting unit 45 makes a comparison between the predicted time at which the vehicle will pass through the adjacent node 97a if the vehicle travels the detected route 96 and the recorded node passage time of the adjacent node 97b on the registered route 93 to determine whether the difference between them is less than a predetermined value, for example, 60 minutes. If the difference is less than the predetermined value, the navigation route setting unit 45 sets the navigation route 98 as shown in FIG. 15B such that the registered route 93 is utilized from the node 97b to the common destination 92, 95, a road corresponding to the link 99 between the nodes 97a and 97b is utilized from the node 97a to the node 97b, and the detected route 96 is utilized from the starting point 94 to the node 97a.

If the difference between the predicted time at which the vehicle will travel through the adjacent node 97a and the recorded time at which the adjacent node 97a was passed through is equal to or greater than the predetermined value, the navigation route setting unit 45 displays a screen such as that shown in FIG. 15C on the display unit 35 to prompt the user to determine whether to select the registered route 93 as the navigation route 98. For example, a registered route selection button 71 for selecting the registered route 93 as the navigation route 98 and a recommended route selection button 72 for selecting the detected route 96 as the navigation route 98 are displayed on the display screen. If the user selects the registered route selection button 71, the navigation route setting unit 45 sets the navigation route 98 as shown in FIG. 15B such that the registered route 93 is utilized from the adjacent node 97b to the common destination 92, 95, the detected route 96 is utilized from the starting point 94 to the adjacent node 97a, and the link 99 between the node 97a and the node 97b is utilized from the node 97a to the node 97b. If the user selects the recommended route selection button 72, the navigation route setting unit 45 sets the navigation route 98 such that the detected route 96 is utilized from the starting point 94 to the destination 92, 95. Thus, the route from the starting point 94 to the destination 92, 95 is properly selected by the user and displayed on the display screen of the display unit 35 thereby providing route navigation/guidance.

If there are two or more sets of adjacent nodes 97a and 97b, the navigation route setting unit 45 selects a node set including a node (e.g., 97b) with a smallest difference between predicted and recorded node passage times, from the two or more sets of adjacent nodes on the registered route 93 from the common destination 92, 95, and the navigation route setting unit 45 sets the navigation route 98 such that the registered route 93 is utilized as the navigation route 98 from the selected node 97b to the destination 92, 95.

If the route comparison unit 44 determines that the starting points 91 and 94 are substantially identical to each other, the navigation route is set in a similar manner to the case in which the destination 92 and the destination 95 are substantially identical to each other. That is, the navigation route setting unit 45 compares the predicted node passage time for the adjacent node 97a if the vehicle travels the detected route 96 and the recorded node passage time of the adjacent node 97b on the registered route 93 to determine whether the difference between them is less than the predetermined value. If the difference is less than the predetermined value, the navigation route setting unit 45 sets the navigation route 98 such that the registered route 93 is utilized from the starting point 91, 94 to the common node 97b, the detected route 96 is utilized from the adjacent node 97a to the destination 95, and the link 99 between the node 97a and the node 97b is utilized from the node 97a to the node 97b.

If the difference between the predicted time at which the vehicle will pass through the adjacent node 97a and the recorded time at which the adjacent node 97a was passed through is equal to or greater than the predetermined value, the navigation route setting unit 45 prompts the user to determine whether to select the registered route 93 as the navigation route 98. For example, the registered route selection button 71 and the recommended route selection button 72 are displayed on the display screen of the display unit 35. If the user selects the registered route selection button 71, the navigation route setting unit 45 sets the navigation route 98 such that the registered route 93 is utilized from the starting point 91, 94 to the adjacent node 97b, the detected route 96 is utilized from the adjacent node 97a to the destination 95, and the link 99 between the node 97a and the node 97b is utilized from the node 97a to the node 97b. On the other hand, if the user selects the recommended route selection button 72, the navigation route setting unit 45 sets the navigation route 98 such that the detected route 96 is utilized from the starting point 91, 94 to the destination 95. Thus, the route from the starting point 91, 94 to the destination 95 is properly selected by the user and displayed on the display screen of the display unit 35 thereby providing route navigation/guidance.

In a case in which there are two or more sets of adjacent nodes 97a and 97b, the navigation route setting unit 45 selects a node set including a node (e.g., 97b) with a smallest difference between predicted and recorded node passage times from the common starting point 91, 94, from the two or more sets of adjacent nodes on the registered route 93, and the navigation route setting unit 45 sets the navigation route 98 such that the registered route 93 is selected from the starting point 91, 94 to the selected node 97b.

Figure 16:
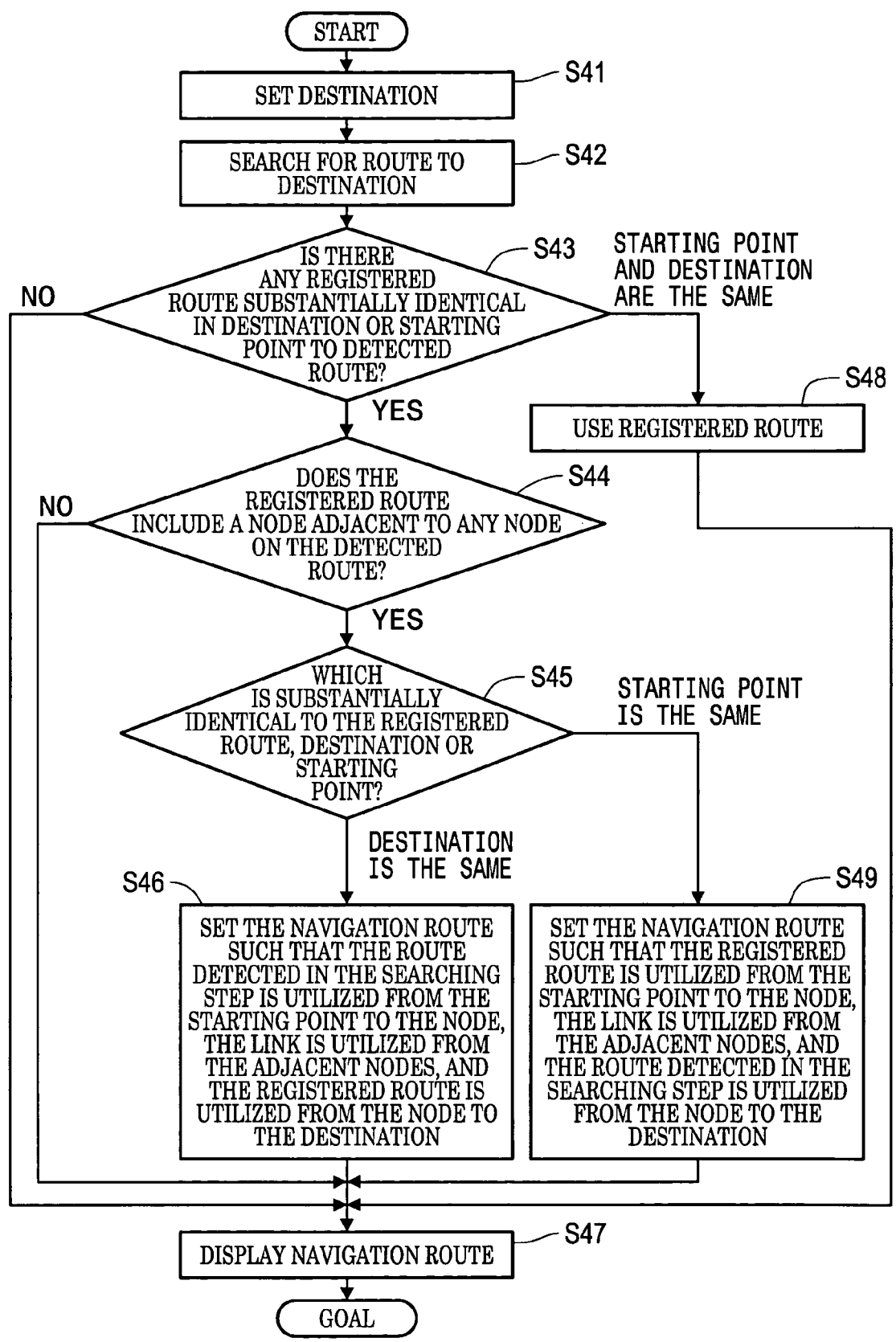
FIG. 16 is a flow chart showing a process performed by a vehicle navigation apparatus to set a registered route to a destination as a navigation route, according to the fourth exemplary embodiment of the invention.

The above-described process is described further with reference to the flow chart shown in FIG. 16. First, in step S41, a destination 95 is set. Then, in step S42, a route 96 to the destination 95 is searched for. In step S43, it is determined whether there is a registered route 93 whose starting point 91 or destination 92 is substantially identical to the starting point 94 or the destination 95 of the detected route 96. If it is determined that there is a registered route 93 whose starting point 91 or destination 92 is substantially identical to the starting point 94 or the destination 95 of the detected route 96, the process proceeds to step S44. If it is determined that there is no registered route 93 whose starting point 91 or destination 92 is substantially identical to the starting point 94 or the destination 95 of the detected route 96, the process jumps to step S47. If it is determined that there is a registered route 93 whose starting point 91 and destination 92 are substantially identical to the starting point 94 and the destination 95 of the detected route 96, the process jumps to step S48.

In step S44, it is determined whether the registered route 93 includes a node 97b adjacent to a node 97a on the route 96 detected in the searching process. If it is determined that the registered route 93 includes a node 97b adjacent to a node 97a on the route 96 detected in the searching process, the process proceeds to step S45. If it is determined that there is no registered route 93 including a node 97b adjacent to a node 97a on the route 96 detected in the searching process, the process jumps to step S47.

In step S45, it is determined whether the starting points 91 and 94 are substantially identical to each other or the destination points 92 and 95 are substantially identical to each other. If it is determined that the starting points 91 and 94 are substantially identical to each other, the process jumps to step S49. On the other hand, if it is determined that destination points 92 and 95 are substantially identical to each other, the process proceeds to step S46.

In step S46, if the difference between the predicted time at which the vehicle will pass through the adjacent node 97a and the recorded time at which the adjacent node 97b was passed through is less than a predetermined value, or if the user selects the registered route although the difference is not less than the predetermined value, the navigation route 98 is set such that the detected route 96 process is utilized from the starting point 94 to the node 97a, the link 99 is utilized from the node 97a to the node 97b, and the registered route 93 is utilized from the node 97b to the destination 92, 95.

In step S47, the navigation route 98 is displayed, and the process is ended. In step S48, the registered route 93 is set as the navigation route 98. In step S49, if the difference between the predicted time at which the vehicle will pass through the adjacent node 97*a* and the recorded time at which the adjacent node 97*b* was passed through is less than a predetermined value, or if the user selects the registered route although the difference is not less than the predetermined value, the navigation route 98 is set such that the registered route 93 is utilized from the starting point 91, 94 to the node 97*a*, the link 99 is utilized from the node 97*a* to the node 97*b*, and the detected route 96 is employed from the node 97*b* to the destination 92, 95.

According to the fourth exemplary embodiment, as described above, when the route comparison unit 44 determines that there is a registered route 93 whose starting point 91 or destination 92 is substantially identical to the starting point 94 or the destination 95 of the detected route 96, and the registered route 93 includes a node 97*b* adjacent to a node 97*a* on the detected route 96, the navigation route setting unit 45 makes a comparison between the predicted node passage time for the adjacent node 97*a* on the detected route 96 and the recorded node passage time for node 97*b* on the registered route 93, to determine whether the difference between them is less than the predetermined value. Note that in the comparison of the difference between predicted node passage time and recorded node passage time, either a node on the registered route 83 or a node on the detected route 86 may be utilized. Also note that the node utilized in the comparison may be a common starting point 81 or 84 or a common destination 82 or 85.

If the difference is less than the predetermined value or if the user selects the registered route 93 regardless of the value of the difference, the navigation route setting unit 45 sets the navigation route 98 such that the registered route 93 is utilized from the common starting point 91, 94 to the common node 97*b* or from the common node 97*b* to the common destination 92, 95. That is, in the case in which there is a registered route 93 whose starting point 91 or destination 92 is substantially identical to the starting point 94 or the destination 95 of the detected route 96, at least a part of the registered route 93 including the common starting point 91, 94 or the common destination 92, 95 is employed as the navigation route 98. Thus, the route that is more suitable for the user is employed as the navigation route 98.

According to the fourth exemplary embodiment, unlike the third exemplary embodiment described earlier in which a registered route 93 is utilized as a navigation route 98 only when the registered route 93 includes a node that is also included in a route 96 detected in the searching process, at least a part of the registered route 93 including the common starting point 91, 94 or the common destination 92, 95 is utilized as the navigation route 98 if the registered route 93 and the route 96 detected in the searching process are adjacent to each other via some link. This results in an increased probability that a registered route 93 that has been selected in advance as a suitable route by the user and stored in the route bank will be employed in the determination of the navigation route. This allows the user to drive his/her vehicle, relying on a navigation route presented by the vehicle navigation apparatus 15, and thus the vehicle navigation apparatus 15 becomes more useful for the user.

As described above, the navigation route setting unit sets a navigation route such that if the comparison made by the route comparison unit 44 indicates that the starting point 92 or the destination point 95 of the route 96 detected in the searching is substantially identical to the starting point 91 or the destination point 95 of the registered route, and the detected route 96 a node 97*a* adjacent to a node 97*b* included in the registered route 93, the determination as to whether to utilize the registered route as the navigation route from the starting point 91, 94 or the destination 92, 94 to the adjacent node 97*a* or 97*b* on the registered route is made in accordance with the predicted times at which the adjacent nodes 97*a* and 97*b* on the route 96 detected in the searching will be passed through and the recorded times at which the adjacent nodes 97*a* and 97*b* on the registered route 93 were passed through. This makes it possible to determine whether to employ the registered route as the navigation route 98 taking into account the time zone in which the vehicle runs the route.

A fifth exemplary embodiment of the invention is described below with reference to FIGS. 17A-17C. According to the fifth exemplary embodiment, similar parts to those in the first-fourth exemplary embodiments are denoted by similar reference numerals, and a description thereof is omitted. Operations and advantages similar to those in the first-fourth exemplary embodiments are also omitted.

Figure 17A:
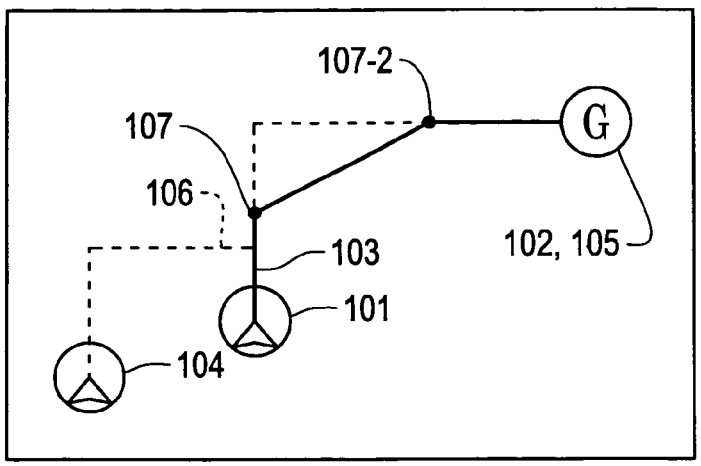
FIGS. 17A-17C are diagrams showing a process performed by a vehicle navigation apparatus to set a registered route to a destination as a navigation route, according to a fifth exemplary embodiment of the invention.
Figure 17B:
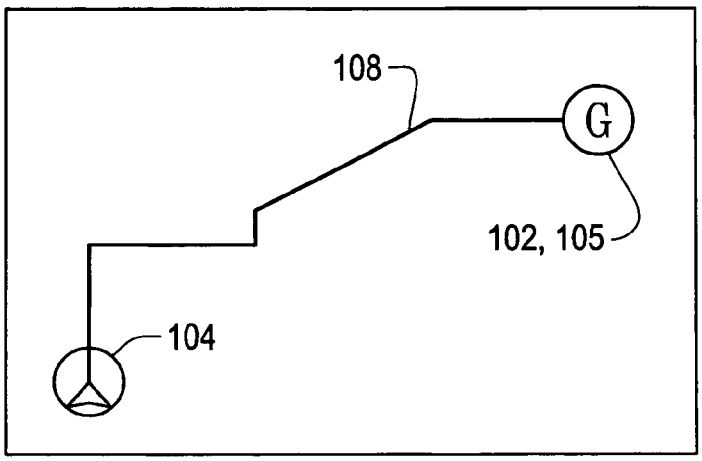
Figure 17C:
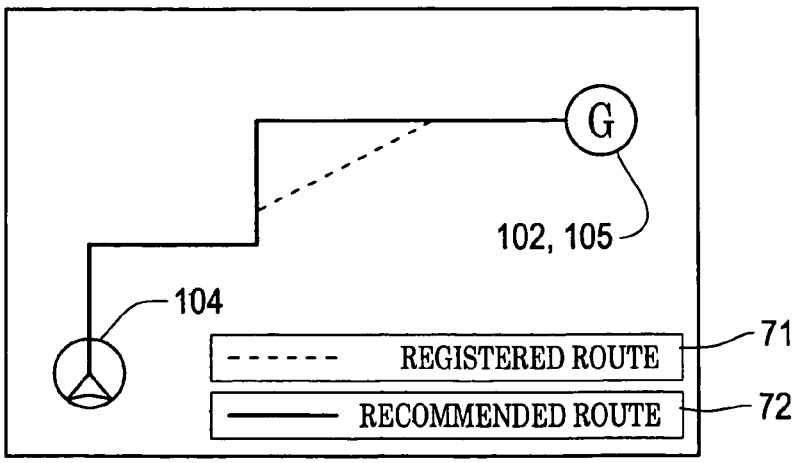

FIGS. 17A-17C are diagrams showing a process performed by a vehicle navigation apparatus to set a registered route to a destination as a navigation route, according to the fifth exemplary embodiment of the invention.

If there is a registered route whose starting point or destination is substantially identical to that of a route detected in the searching process, the registered route is set as a navigation route as described below. If it is determined that there is a common node included in both a registered route 103 and a detected route 106, the route comparison unit 44 further determines whether the starting points 101 and 104 are substantially identical to each other or the destination points 102 and 105 are substantially identical to each other. If the route comparison unit 44 determines that the destination 102 of the registered route 103 and the destination 105 of the detected route 106 are substantially identical to each other, as is the case in the example shown in FIG. 17A, the navigation route setting unit 45 determines whether traffic information associated with the registered route 103 from the common node 107 to the destination 102, 105 is available. The traffic information is, for example, traffic congestion information, traffic restriction information, or traffic accident information. If there is no available traffic information, the navigation route setting unit 45 sets the navigation route 108 as shown in FIG. 17B such that the registered route 103 is utilized from the common node 107 to the destination 102, 105 and the detected route 106 is utilized from the starting point 104 to the common node 107.

When there is available traffic information associated with the registered route 103 from the common node 107 to the destination 102, 105 the navigation route setting unit 45 displays a screen such as that shown in FIG. 17C on the display unit 35 to prompt the user to determine whether to select the registered route 103 as the navigation route 108. For example, a registered route selection button 71 for selecting the registered route 103 as the navigation route 108 and a recommended route selection button 72 for selecting the detected route 106 as the navigation route 108 are displayed on the display screen. If the user selects the registered route selection button 71, the navigation route setting unit 45 sets the navigation route 108 as shown in FIG. 17B such that the registered route 103 is utilized from the common node 107 to the destination 102, 105 and the detected route 106 is utilized from the starting point 104 to the common node 107. If the user selects the recommended route selection button 72, the navigation route setting unit 45 sets the navigation route 108 such that the detected route 106 is employed from the starting point 104 to the destination 102, 105. Thus, the route from the starting point 104 to the destination 102, 105 is properly selected by the user and displayed on the display screen of the display unit 35 thereby providing route navigation/guidance.

If two or more nodes 107 are common to the two routes, as is the case in the example shown in FIG. 17A in which nodes 107 and 107-2 are common to the two routes, the navigation route setting unit 45 detects a node 107 that is the farthest from the common destination 102, 105 as measured along the registered route 103, and sets the navigation route 108 such that the registered route 103 is utilized from the detected node 107 to the destination 102, 105.

If the route comparison unit 44 determines that the starting points 101 and 104 are substantially identical to each other, the navigation route is set in a similar manner to the case in which the destination 102 and the destination 105 are substantially identical to each other. That is, the navigation route setting unit 45 determines whether traffic information associated with the registered route 103 from the starting point 101, 104 to the common node 107 is available. If there is no available traffic information, the navigation route setting unit 45 sets the navigation route 108 such that the registered route 103 is selected from the starting point 101, 104 to the common node 107, and the detected route 106 is utilized from the common node 107 to the destination 105.

When there is available traffic information associated with the registered route 103 from the starting point 101, 104 to the common node 107, the navigation route setting unit 45 prompts the user to determine whether to select the registered route 103 as the navigation route 108. For example, the registered route selection button 71 and the recommended route selection button 72 are displayed on the display screen of the display unit 35. If the user selects the registered route selection button 71, the navigation route setting unit 45 sets the navigation route 108 such that the registered route 103 is selected from the starting point 101, 104 to the common node 107, and the detected route 106 is utilized from the common node 107 to the destination 105. If the user selects the recommended route selection button 72, the navigation route setting unit 45 sets the navigation route 108 such that the detected route 106 is utilized from the starting point 101, 104 to the destination 105. Thus, the route from the starting point 101, 104 to the destination 105 is properly selected by the user and displayed on the display screen of the display unit 35 thereby providing route navigation/guidance.

If two or more nodes 107 are common to the two routes, the navigation route setting unit 45 detects a node 107-2 that is the farthest from the common starting point 101, 104 as measured along the registered route 103, and sets the navigation route 108 such that the registered route 103 is utilized from the starting point 101, 104 to the common node 107-2.

According to the fifth exemplary embodiment, as described above, when the route comparison unit 44 determines that there is a registered route 103 whose starting point 101 or destination 102 is substantially identical to the starting point 104 or the destination 105 of the detected route 106, and there is a node 107 common to both the registered route 103 and the detected route 106, the navigation route setting unit 45 determines whether traffic information associated with the registered route 103 from the starting point 101, 104 or the destination 102, 105 to the common node 107 is available. If there is no available traffic information associated with the registered route 103 or if the user selects the registered route 103 regardless of whether or not there is traffic information, the navigation route setting unit 45 sets the navigation route 108 such that the registered route 103 is utilized from the common starting point 101, 104 to the common node 107 or from the common node 107 to the common destination 102, 105. Thus, the route that is more suitable for the user is employed as the navigation route 108.

If there is available traffic information associated with the registered route 103 from the starting point 101, 104 or the destination 102, 105 to the common node 107, the user is prompted to determine whether to select the registered route 103. This makes it possible for the user to select a more proper route when the traffic information indicates, for example, that there is traffic congestion on the registered route 103.

A sixth exemplary embodiment of the invention is described below with reference to FIGS. 18A-19. In the sixth exemplary embodiment, similar parts to those in the first-fifth exemplary embodiments are denoted by similar reference numerals, and a description thereof is omitted. Operations and advantages similar to those in the first-fifth exemplary embodiments are also omitted.

Figure 18A:
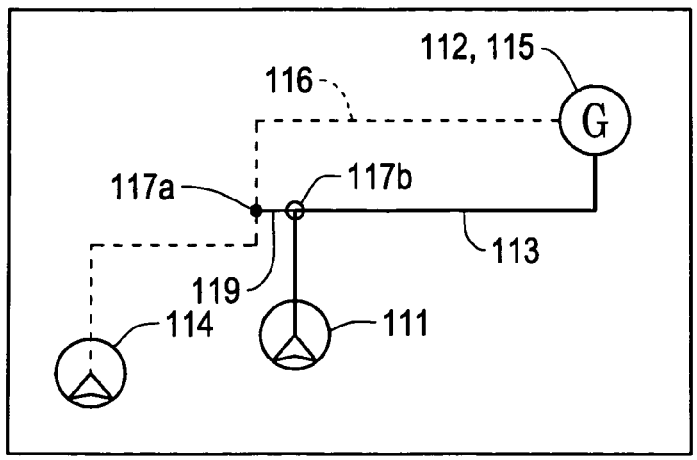
FIGS. 18A-18C are diagrams showing a process performed by a vehicle navigation apparatus to set a registered route to a destination as a navigation route, according to a sixth exemplary embodiment of the invention.
Figure 18B:
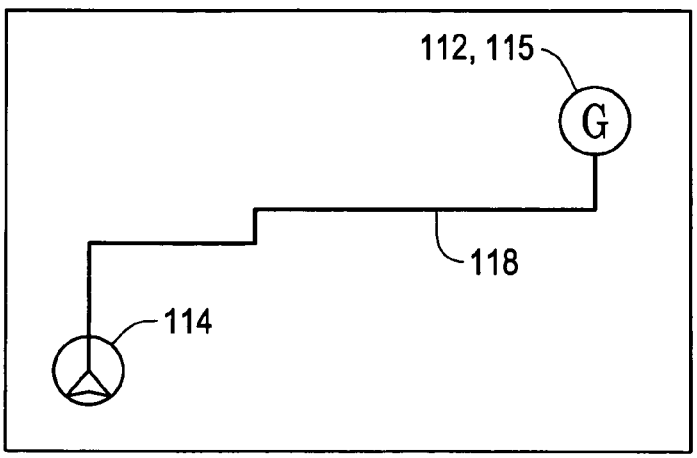
Figure 18C:
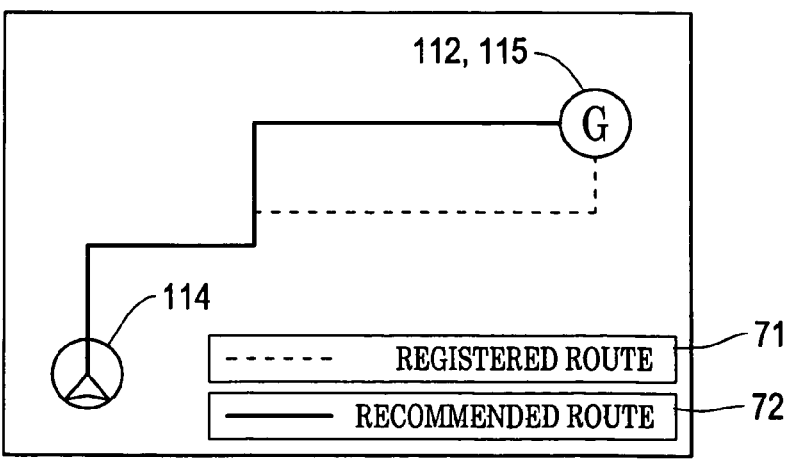

FIGS. 18A-18C are diagrams showing a process performed by a vehicle navigation apparatus to set a registered route to a destination as a navigation route, according to the sixth exemplary embodiment of the invention. FIG. 19 is a flow chart showing a process performed by the vehicle navigation apparatus to set a registered route to a destination as a navigation route, according to the sixth exemplary embodiment of the invention.

According to the sixth exemplary embodiment, the route comparison unit 44 determines whether there is a registered route whose starting point or destination is substantially identical to that of the detected route. If such a registered route is found, then the route comparison unit 44 further determines whether the registered route includes a node adjacent to a node included in the detected route. On the basis of the traffic information associated with the registered route from the starting point or the destination to the adjacent node, the navigation route setting unit 45 determines whether the registered route from the starting point or the destination to the adjacent node on the registered route is employed as the navigation route. That is, according to the sixth exemplary embodiment, if there is a registered route whose starting point or destination is substantially identical to that of a detected route, and if the registered route includes a node adjacent to a node included in the detected route, even if there is no node included in common in both the detected route and the registered route, the navigation route is set such that if there is no available traffic information associated with the registered route or if the user selects the registered route regardless of whether or not there is traffic information, a part of the registered route is utilized as the navigation route.

If it is determined that the registered route 113 includes a node 117b adjacent to a node 117a on the detected route 116, the route comparison unit 44 determines whether the starting points 111 and 114 are substantially identical to each other or the destination points 112 and 115 are substantially identical to each other. If the route comparison unit 44 determines that the destination points 112 and 115 are substantially identical to each other as is the case in the example shown in FIG. 18A, the navigation route setting unit 45 determines whether traffic information associated with the registered route 113 from the adjacent node 117b to the destination 112, 115 is available. If there is no available traffic information, the navigation route setting unit 45 sets the navigation route 118 as shown in FIG. 18B such that the registered route 113 is utilized from the node 117b to the destination 112, 115 a road corresponding to the link 119 between the nodes 117a and 117b is utilized from the node 117a to the node 117b, and the route 116 detected in the searching process is utilized from the starting point 114 to the node 117a.

When there is available traffic information associated with the registered route 113 from the adjacent node 117b to the destination 112, 115, the navigation route setting unit 45 displays a screen such as that shown in FIG. 18C on the display unit 35 to prompt the user to determine whether to select the registered route 113 as the navigation route 118. For example, a registered route selection button 71 for selecting the registered route 113 as the navigation route 118 and a recommended route selection button 72 for selecting the detected route 116 as the navigation route 118 are displayed on the display screen. If the user selects the registered route selection button 71, the navigation route setting unit 45 sets the navigation route 118 as shown in FIG. 18B such that the registered route 113 is utilized from the adjacent node 117b to the destination 112, 115, the detected route 116 is utilized from the starting point 114 to the adjacent node 117a, and the link 119 between the node 117a and the node 117b is utilized from the node 117a to the node 117b. If the user selects the recommended route selection button 72, the navigation route setting unit 45 sets the navigation route 118 such that the detected route 116 is utilized from the starting point 114 to the destination 112, 115. Thus, the route from the starting point 114 to the destination 112, 115 is properly selected by the user and displayed on the display screen of the display unit 35 thereby providing route navigation/guidance.

If there are two or more sets of adjacent nodes 117a and 117b, the navigation route setting unit 45 detects a node set including a node 117b that is the farthest from the destination 112, 115 as measured along the registered route 113 and sets the navigation route 118 such that the registered route 113 is utilized from the detected node 117b to the destination 112, 115.

If the route comparison unit 44 determines that the starting points 111 and 114 are substantially identical to each other, the navigation route is set in a similar manner to the case in which the destination 112 and the destination 115 are substantially identical to each other. That is, the navigation route setting unit 45 determines whether traffic information associated with the registered route 113 from the starting point 111, 114 to the adjacent node 117b is available. If there is no available traffic information, the navigation route setting unit 45 sets the navigation route 118 such that the registered route 113 is utilized from the starting point 111, 114 to the adjacent node 117b, the detected route 116 is utilized from the adjacent node 117a to the destination 115, and the link 119 between the node 117a and the node 117b is utilized from the node 117a to the node 117b.

When there is available traffic information associated with the registered route 113 from the starting point 111, 114 to the adjacent node 117b, the navigation route setting unit 45 prompts the user to determine whether to select the registered route 113 as the navigation route 118. For example, the registered route selection button 71 and the recommended route selection button 72 are displayed on the display screen of the display unit 35. If the user selects the registered route selection button 71, the navigation route setting unit 45 sets the navigation route 118 such that the registered route 113 is utilized from the starting point 111, 114 to the adjacent node 117b, the detected route 116 is utilized from the adjacent node 117b to the destination 105, and the link 119 between the node 117a and the node 117b is utilized from the node 117a to the node 117b.

If the user selects the recommended route selection button 72, the navigation route setting unit 45 sets the navigation route 118 such that the detected route 116 is utilized from the starting point 111, 114 to the destination 115. Thus, the route from the starting point 111, 114 to the destination 115 is properly selected by the user and displayed on the display screen of the display unit 35 thereby providing route navigation/guidance.

In a case in which there are two or more sets of adjacent nodes 117a and 117b, the navigation route setting unit 45 detects a node set including a node 117b that is the farthest from the common starting point 111, 114 as measured along the registered route 113, and sets the navigation route 118 such that the registered route 113 is employed from the starting point 111, 114 to the node 117b.

Figure 19:
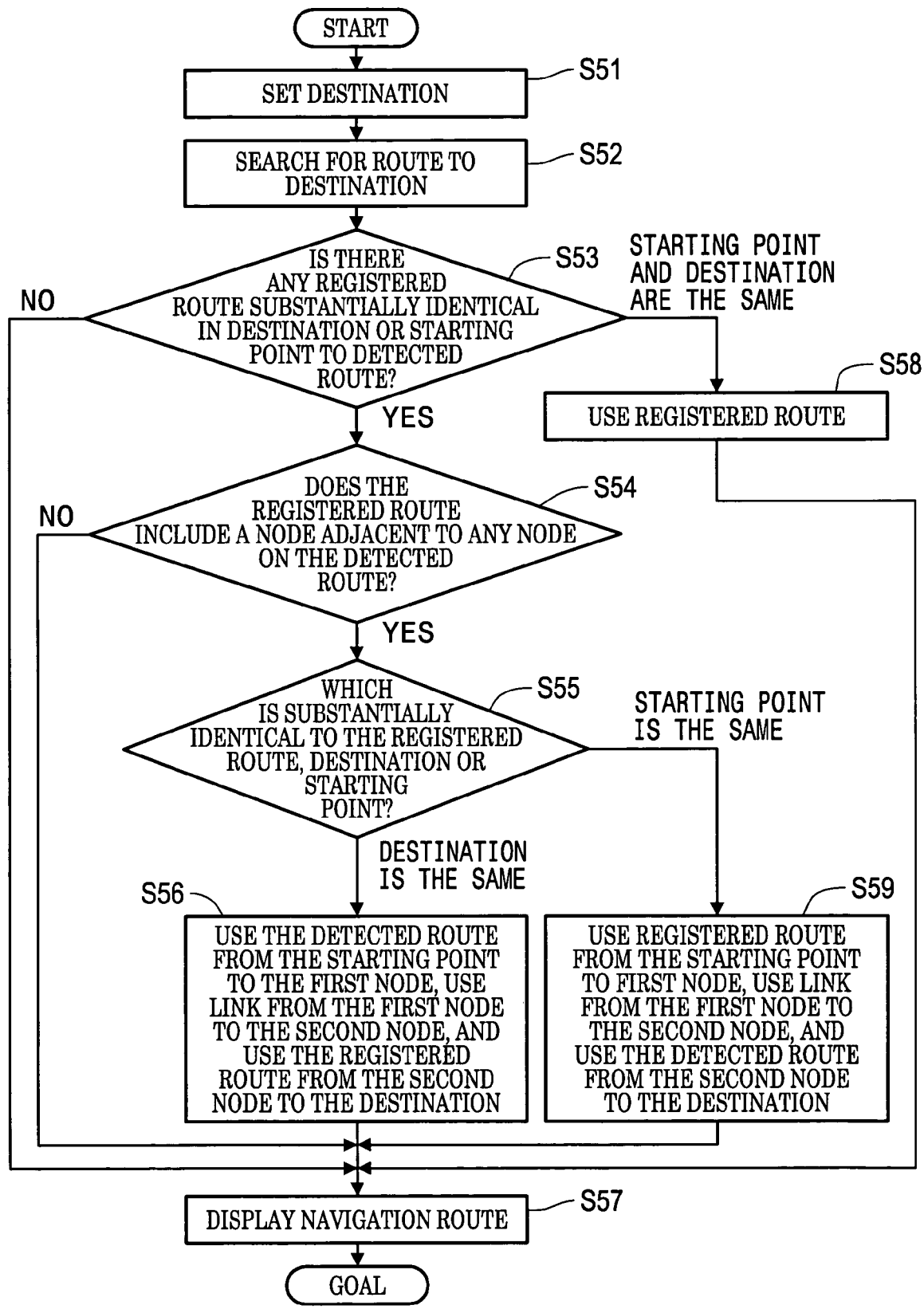
FIG. 19 is a flow chart showing a process performed by a vehicle navigation apparatus to set a registered route to a destination as a navigation route, according to the sixth exemplary embodiment of the invention.

The above-described process is described farther with reference to the flow chart shown in FIG. 19. In step S51, a destination 115 is set. Next, in step S52, a route 116 to the destination 115 is searched for.

In step S53, it is determined whether there is a registered route 113 whose starting point 111 or destination 112 is substantially identical to the starting point 114 or the destination 115 of the detected route 116. If it is determined that there is a registered route 113 whose starting point 111 or destination 112 is substantially identical to the starting point 114 or the destination 115 of the detected route 116, the process proceeds to step S54. If it is determined that there is no registered route 113 whose starting point 111 or destination 112 is substantially identical to the starting point 114 or the destination 115 of the route 116 detected in the searching process, the process jumps to step S57. If it is determined that there is a registered route 113 whose starting point 111 and destination 112 are substantially identical to the starting point 114 and the destination 115 of the route 116 detected in the searching process, the process jumps to step S58.

In step S54, it is determined whether the registered route 113 includes a node 117b adjacent to a node 117a on the detected route 116. If it is determined that the registered route 113 includes a node 117b adjacent to a node 117a on the detected route 116, the process proceeds to step S55. If it is determined that there is no registered route 113 including a node 117b adjacent to a node 117a on the detected route 116, the process jumps to step S57.

In step S55, it is determined whether the starting points 111 and 114 are substantially identical to each other or the destination points 112 and 115 are substantially identical to each other. If it is determined that the starting points 111 and 114 are substantially identical to each other, the process jumps to step S59. If it is determined that destination points 112 and 115 are substantially identical to each other, the process proceeds to step S56.

In step S56, if there is no available traffic information associated with the registered route 113 or if the user selects the registered route 113 regardless of whether or not there is traffic information, the detected route 116 is utilized from the starting point 114 to the node 117a, the link 119 is utilized from the node 117a to the node 117b, and the registered route 113 is utilized from the node 117b to the destination 112, 115.

In step S57, the navigation route 118 is displayed, and the process is ended. In step S58, the registered route 113 is set as the navigation route 118. In step S59, if there is no available traffic information associated with the registered route 113 or if the user selects the registered route 113 regardless of whether or not there is traffic information, the registered route 113 is utilized from the starting point 111, 114 to the node 117a, the link 119 is utilized from the node 117a to the node 117b, and the detected route 116 is employed from the node 117b to the destination 115.

According to the sixth exemplary embodiment, as described above, when the route comparison unit 44 determines that there is a registered route 113 whose starting point 111 or destination 112 is substantially identical to the starting point 114 or the destination 115 of the detected route 116, and the registered route 113 includes a node 117b adjacent to a node 117a on the detected route 116, the navigation route setting unit 45 determines whether traffic information associated with the registered route 113 from the starting point 111 or the destination 112 to the adjacent node 107 is available. If there is no available traffic information associated with the registered route 113 or if the user selects the registered route 113 regardless of whether or not there is traffic information, the navigation route setting unit 45 sets the navigation route 118 such that the registered route 113 is utilized from the common starting point 111, 104 to the node 117b or from the node 117b to the common destination 112, 105. That is, in the case in which there is a registered route 113 whose starting point 111 or destination 112 is substantially identical to the starting point 114 or the destination 115 of the route 116 detected in the searching process, at least a part of the registered route 113 including the common starting point 111, 114 or the common destination 112, 115 is utilized as the navigation route 118. Thus, the route that is more suitable for the user is employed as the navigation route 118.

In this sixth embodiment, unlike the fifth exemplary embodiment described above in which a registered route 113 is employed as a navigation route 118 only when the registered route 113 includes a node that is also included in a route 116 detected in the searching process, at least a part of the registered route 113 including the common starting point 111, 114 or the common destination 112, 115 is utilized as the navigation route 118 if the registered route 113 and the detected route 116 are adjacent to each other via some link. This results in an increased probability that a registered route 113 that has been selected in advance as a suitable route by the user and stored in the route bank will be employed in the determination of a navigation route. This allows the user to drive his/her vehicle, relying on a navigation route presented by the vehicle navigation apparatus 15, and thus the vehicle navigation apparatus 15 becomes more useful for the user.

Also as described above, when the comparison made by the route comparison unit 44 indicates that there is a registered route 113 whose starting point 111 or destination 112 is substantially identical to the starting point 114 or the destination 115 of the detected route 116, and the registered route 113 includes a node 117b adjacent to a node 117a on the detected route 116, the navigation route setting unit 45 determines whether the registered route 113 from the starting point 111, 114 or the destination 112, 115 to the adjacent node 117a or 117b is utilized as the navigation route 118, in accordance with the traffic information associated with the registered route 113 from the starting point 111, 114 or the destination 112, 115 to the adjacent node 117a or 117b. That is, the sixth exemplary embodiment makes it possible to determine the navigation route taking into account traffic information associated with the registered route.

In the first to sixth exemplary embodiments of the present invention described above, the data stored in the data storage unit 16 disposed in the vehicle navigation apparatus 15, and the navigation route 58 or 68 is set based on the data read from the data. Alternatively, the data may be stored, for example, in a server disposed in an information center or the like, and the vehicle navigation apparatus 15 may access the server by means of, for example, radio communication or the like to acquire the navigation route 58 or 68 set by the server. Alternatively, only the route searching process may be performed by the server. In this case, the vehicle navigation apparatus 15 acquires from the server a route 56 or 66 detected in the route searching process performed by the server, compares the acquired route 56 or 66 with registered routes 53 or 63 stored in the data storage unit 16, and determines the navigation route 58 or 68 based on the comparison result.

While various features of this invention have been described in conjunction with the exemplary embodiments outlined above, various alternatives, modifications and variations and/or improvements of these features may be possible. Accordingly, the exemplary embodiments of the invention, as set forth above, are intended to be illustrative. Various changes may be made without departing from the spirit and scope of the invention.

What is claimed is:

1. A navigation apparatus, comprising:
    a memory that stores registered routes, wherein each registered route includes a previously traveled route, a corresponding starting point, a corresponding destination point, and a time at which each node on the registered route was through; and
    a controller that:
        searches for a route from a specified starting point to a specified destination point;
        compares the searched route with the registered routes;
        when a corresponding starting point is substantially identical to the specified starting point or a corresponding destination point is substantially identical to the specified destination point, utilizes a portion of a registered route including the substantially identical starting point or the substantially identical destination point as a navigation route; and
        when there is a common node or an adjacent node in both the searched route and the registered route:
            utilizes a portion of the registered route from the substantially identical starting point to the common node or the adjacent node as the navigation route, or utilizes a portion of the registered route from the common node or the adjacent node to the substantially identical destination point as the navigation route;
            predicts a time at which the common node or the adjacent node on the searched route will be passed through; and
            sets the navigation route in accordance with the predicted time and the stored time at which the common node or the adjacent node was passed through on the registered route.

2. The navigation apparatus of claim 1, wherein the controller sets the navigation route such that, if the registered route includes the substantially identical starting point and the substantially identical destination point, the registered route is utilized as the navigation route.

3. The navigation apparatus of claim 1, wherein the controller sets the navigation route such that, if the difference between the predicted time and the stored time is less than a predetermined value, the registered route is utilized as the navigation route from the substantially identical starting point to the common node or the adjacent node, or from the common node or the adjacent node to the substantially identical destination point.

4. The navigation apparatus of claim 1, wherein the controller, if the difference between the predicted time and the stored time is greater than or equal to a predetermined value, prompts a user to determine whether the registered route is utilized as the navigation route from the substantially identical starting point to the common node or the adjacent node or from the common node or the adjacent node to the substantially identical destination point.

5. The navigation apparatus of claim 1, wherein the controller sets the navigation route such that, if there is more than one common node or more than one adjacent node in both the searched route and the registered route, the registered route is utilized as the navigation route from the substantially identical starting point to one of the common nodes or one of the adjacent nodes with a smaller difference between the predicted time and a stored time to the substantially identical starting point or the registered route is utilized as the navigation route from one of the common nodes or one of the adjacent nodes with a smaller difference between the predicted time and a stored time to the substantially identical destination point.

6. The navigation apparatus of claim 1, wherein the controller sets the navigation route in accordance with traffic information associated with the registered route from the substantially identical starting point to the common node or the adjacent node on the registered route or with traffic information associated with the registered route from the common node or the adjacent node on the registered route to the substantially identical destination point.

7. The navigation apparatus of claim 6, wherein the controller sets the navigation route such that, if there is no traffic information associated with the registered route from the substantially identical starting point to the common node or the adjacent node on the registered route or from the common node or the adjacent node on the registered route to the substantially identical destination point, the registered routes is utilized as the navigation route from the substantially identical starting point to the common node or the adjacent node, or from the common node or the adjacent node to the substantially identical destination point.

8. The navigation apparatus of claim 6, wherein the controller, if there is traffic information associated with the registered route from the substantially identical starting point to the common node or the adjacent node on the registered route or from the common node or the adjacent node on the registered route to the substantially identical destination point, prompts a user to determine whether the registered route is utilized as the navigation route from the substantially identical starting point to the common node or the adjacent node, or from the common node or the adjacent node to the substantially identical destination point.

9. The navigation apparatus of claim 6, wherein the controller sets the navigation route such that, if there is more than one common node or adjacent node in both the searched route and the registered route, the registered route is utilized as the navigation route from the substantially identical starting point to one of the common nodes or one of the adjacent nodes farthest from the substantially identical starting point or the registered route is utilized as the navigation route from one of the common nodes or one of the adjacent nodes farthest from the substantially identical destination point to the substantially identical destination point.

10. The navigation apparatus of claim 1, wherein each registered route is stored in response to a determination made by a user to register a traveled route when a vehicle arrives at a destination point.

11. The navigation apparatus of claim 1, wherein the controller: registers starting points and destination points as a registered points; and selects, from routes between registered points, a route that is traveled more than a predetermined number of times as a registered route.

12. A method for determining a navigation route, comprising:

storing registered routes, wherein each registered route includes a previously traveled route, a corresponding starting point, a corresponding destination point and a time at which each node on the registered route was passed through;

searching for a route from a specified starting point to a specified destination point;

comparing the searched route with the at least one registered route; and utilizing, when a corresponding starting point is substantially identical to the specified starting point or a corresponding destination point is substantially identical to the specified destination point, a portion of a registered route including the substantially identical starting point or the substantially identical destination point as a navigation route; and when there is a common node or an adjacent node in both the searched route and the registered route:

utilizing a portion of the registered route from the substantially identical starting point to the common node or the adjacent node as the navigation route, or utilizes a portion of the registered route from the common node or the adjacent node to the substantially identical destination point as the navigation route;

predicting a time at which the common node or the adjacent node on the searched route will be passed through; and setting the navigation route in accordance with the predicted time and the stored time at which the common node or the adjacent node was passed through on the registered route.

13. A computer-readable storage medium storing a set of program instructions executable on a data processing device and usable for determining a navigation route, the set of program instructions comprising:

instructions for storing registered routes, wherein each registered route includes a previously traveled route, a corresponding starting point, a corresponding destination point, and a time at which each node on the registered route was passed through;

instructions for searching for a route from a specified starting point to a specified destination point;

instructions for comparing the searched route with the at least one registered route; and instructions for utilizing, when a corresponding starting point is substantially identical to the specified starting point or a corresponding destination point is substantially identical to the specified destination point, a portion of a registered route including the substantially identical starting point or the substantially identical destination point as a navigation route; and instructions for, when there is a common node or an adjacent node in both the searched route and the registered route:

utilizing a portion of the registered route from the substantially identical starting point to the common node or the adjacent node as the navigation route, or utilizes a portion of the registered route from the common node or the adjacent node to the substantially identical destination point as the navigation route;

predicting a time at which the common node or the adjacent node on the searched route will be passed through; and setting the navigation route in accordance with the predicted time and the stored time at which the common node or the adjacent node was passed through on the registered route.

* * * * *